United States Patent
Tsutsui et al.

(10) Patent No.: US 12,494,201 B2
(45) Date of Patent: Dec. 9, 2025

(54) VIEWING ASSISTANCE SYSTEM, VIEWING ASSISTANCE METHOD, AND NONVOLATILE RECORDING MEDIUM STORING PROGRAM

(71) Applicants: KABUSHIKI KAISHA TOSHIBA, Tokyo (JP); TOSHIBA DIGITAL SOLUTIONS CORPORATION, Kawasaki (JP)

(72) Inventors: Hideki Tsutsui, Kawasaki Kanagawa (JP); Ryuji Fukui, Ome Tokyo (JP); Takashi Shibuya, Fuchu Tokyo (JP); Naoki Hirayama, Kawasaki Kanagawa (JP); Masaru Suzuki, Kawasaki Kanagawa (JP)

(73) Assignees: Kabushiki Kaisha Toshiba, Kawasaki Kanagawa (JP); Toshiba Digital Solutions Corporation, Kawasaki Kanagawa (JP)

( * ) Notice: Subject to any disclaimer, the term of this patent is extended or adjusted under 35 U.S.C. 154(b) by 254 days.

(21) Appl. No.: 18/333,176

(22) Filed: Jun. 12, 2023

(65) Prior Publication Data
US 2023/0326459 A1    Oct. 12, 2023

Related U.S. Application Data
(63) Continuation of application No. PCT/JP2021/046128, filed on Dec. 14, 2021.

(30) Foreign Application Priority Data
Dec. 14, 2020    (JP) .................. 2020-207069

(51) Int. Cl.
*G10L 15/00* (2013.01)
*G10L 15/22* (2006.01)
*G10L 15/26* (2006.01)

(52) U.S. Cl.
CPC ........ *G10L 15/22* (2013.01); *G10L 2015/228* (2013.01); *G10L 15/26* (2013.01)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 11,849,196 B2 * 12/2023 Parmar .................. G10L 15/26
2003/0037158 A1  2/2003 Yano et al.
2006/0294453 A1  12/2006 Hirata et al.

FOREIGN PATENT DOCUMENTS

JP    H11-308271 A    11/1999
JP    2010-4309 A    1/2010
(Continued)

*Primary Examiner* — Vu B Hang
(74) *Attorney, Agent, or Firm* — Finnegan, Henderson, Farabow, Garrett & Dunner, LLP

(57) ABSTRACT

A viewing assistance system includes a display unit, a captured image generation unit, a voice recognition unit, and an association storage unit. The display unit includes a display screen on which a content having multiple pages are displayable. The captured image generation unit that generates a captured image of the content that is displayed on the display screen. The voice recognition unit that recognizes a voice included in the content. The association storage unit that associates a voice recognition result that is a result of recognizing the voice included in the content by the voice recognition unit with the captured image generated by the captured image generation unit to store.

13 Claims, 13 Drawing Sheets

(58) Field of Classification Search
CPC ... G10L 15/08; G10L 15/063; G10L 15/1822; G10L 15/183; G10L 15/193; G10L 15/19; G06F 3/16
See application file for complete search history.

(56) References Cited

FOREIGN PATENT DOCUMENTS

| | | |
|---|---|---|
| JP | 4466564 B2 | 5/2010 |
| JP | 2012-43046 A | 3/2012 |
| JP | 2014-85998 A | 5/2014 |
| WO | WO 2005/027092 A | 3/2005 |

* cited by examiner

FIG. 2

| CAPTURE | VOICE RECOGNITION RESULT |
|---|---|
| ONLINE MEDICAL CONSULTATION SYSTEM | IN THE FUTURE, ONLINE MEDICAL CONSULTATION WILL ALSO INCREASE IN THE MEDICAL FIELD. AT THAT TIME, EXPECTED FUNCTIONS OF THE ONLINE RECEIVING SYSTEM ARE AS FOLLOWS. WITH THESE FUNCTIONS WORKING EFFECTIVELY, THERE WILL BE MORE SITUATIONS WHERE IT IS MORE EFFECTIVE THAN FACE-TO-FACE MEDICAL CONSULTATION. [VOICE PLAYBACK] |
| OPERATOR SYSTEM | HERE IS AN EXAMPLE OF A GENERAL SYSTEM USED BY OPERATORS. IT IS CONFIGURED AS A MANAGEMENT SYSTEM THAT IS USED BY OPERATORS THAT ACTUALLY SUPPORT AND SUPERVISORS IN THE BACKGROUND. [VOICE PLAYBACK] |

VIEWING ASSISTANCE SYSTEM, VIEWING ASSISTANCE METHOD, AND NONVOLATILE RECORDING MEDIUM STORING PROGRAM

This application is a continuation application based upon PCT International Application No. PCT/JP2021/046128, filed Dec. 14, 2021, and claims the benefit of priority from Japanese Patent Application No. 2020-207069, filed Dec. 14, 2020; the entire contents of which are incorporated herein by reference.

FIELD

Embodiments of the present disclosure relate to a viewing assistance system, a viewing assistance method, and a non-volatile recording medium storing a program.

BACKGROUND

Conventionally, a document creation-viewing device configured to create documents based on recorded video data and recorded voice data by recoding a meeting, a lecture or the like while providing the abstracted document together with the video and the voice to the document creator and the attendances to view is known. According to the conventional document creation-viewing device, the video data is generated by recording a video of the meeting, and the voice data is generated by recording the voice of the contents during the meeting. Also, the document data including the meeting minutes or the like that are input by the minute creator is generated. Furthermore, the correspondence relationship between the voice or the video and the document is derived based on the voice data or the video data and the document data to generate correspondence relationship table data. The voice or the video and the document are displayed in association based on the correspondence relationship table data.

Conventionally, a method of associating and using the video data by recording the video and the voice data by recording the voice of the meeting, the lecture, and the like is developed.

However, in an online meeting using an online meeting application, a presenter flips through the documents one after another such that there is a case in which a previous page of the currently displayed page cannot be viewed even if the attendance would like to view the previous page.

BRIEF DESCRIPTION OF DRAWINGS

FIG. 2 is a view describing an example in which a captured image and a voice recognition result being associated and stored by an association storage unit are displayed on a second display screen of a display unit.

DETAILED DESCRIPTION

Hereinafter, a viewing assistance system, a viewing assistance method, and a non-volatile recording medium storing a program according to each embodiment will be described.

First Embodiment

Figure 1:
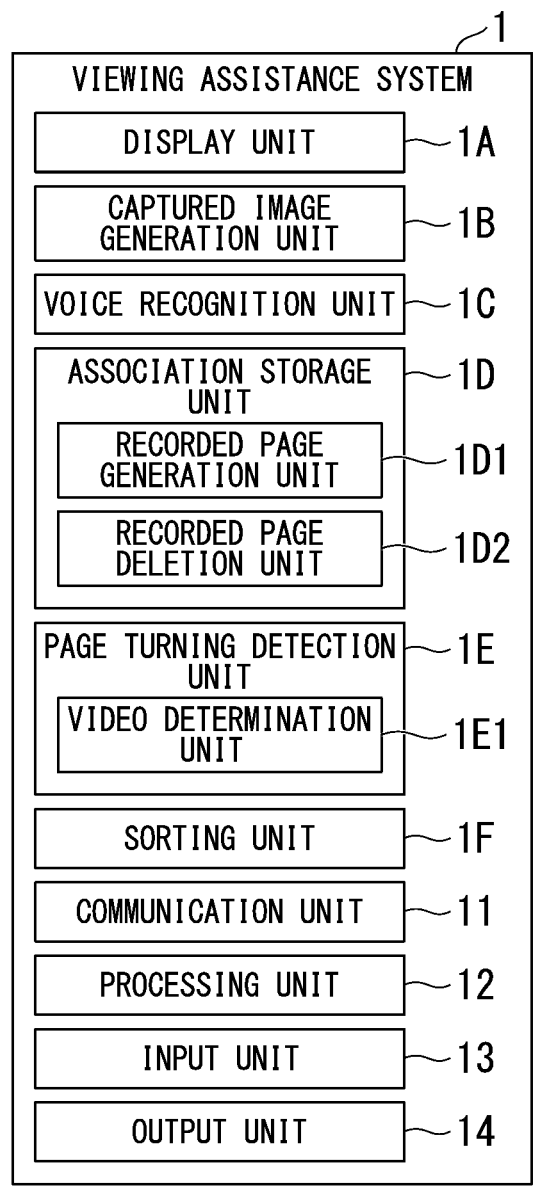
FIG. 1 is a view showing an example of a configuration of a viewing assistance system according to a first embodiment.

FIG. 1 is a view showing an example of a configuration of a viewing assistance system 1 according to the first embodiment.

According to the example shown in FIG. 1, the viewing assistance system 1 is a terminal device having a function as an online meeting application and a function of association and storage described below, for example. The viewing assistance system 1 includes a display unit 1A, a captured image generation unit 1B, a voice recognition unit 1C, an association storage unit 1D, a page turning detection unit 1E, a sorting unit 1F, a communication unit 11, a processing unit 12, an input unit 13, and an output unit 14.

The display unit 1A includes a first display screen and a second display screen. The display unit 1A displays the content (for example, a presentation document or the like being used during the online meeting or the like) having multiple pages on the first display screen.

The captured image generation unit 1B generates a captured image of the content that is displayed on the first display screen of the display unit 1A. For example, the captured image generation unit 1B generates multiple captured images at a predetermined captured image generation interval (for example, for every three-second interval or the like) during the content is displayed on the first display screen of the display unit 1A.

The voice recognition unit 1C recognizes the voice (for example, the utterance voice of the presenter of the online meeting) included in the content to output a voice recognition result. More specifically, the voice recognition unit 1C performs the voice recognition to the voice data included in the content to generate text data.

The association storage unit 1D associates the voice recognition result by the voice recognition unit 1C with the captured image generated by the captured image generation unit 1B and stores the associated voice recognition result and the captured image. The association storage unit 1D may associate a note as a memo that is input by a user of the viewing assistance system 1 in addition to the voice recognition result by the voice recognition unit 1C with the captured image generated by the captured image generation unit 1B and stores the associated voice recognition result, the note, and the captured image.

The association storage unit 1D includes a recorded page generation unit 1D1 and a recorded page deletion unit 1D2.

The recorded page generation unit 1D1 generates a configuration by associating the captured image stored by the association storage unit 1D with the voice recognition result as a candidate of the recorded page. The recorded page generation unit 1D1 generates the multiple recorded pages by associating each of the multiple captured images generated by the captured image generation unit 1B at the interval of every three seconds with the voice recognition result, for example.

The recorded page deletion unit 1D2 has the function of deleting part of the multiple recorded pages that are generated by the recorded page generation unit 1D1.

In a case in which the recorded page deletion unit 1D2 deletes part of the multiple recorded pages, the association storage unit 1D associates the voice recognition result that is associated with the captured image configuring the deleted recorded page with the captured image configuring the recorded page that is not deleted and stores as the recorded page.

The display unit 1A has both functions of displaying the content having multiple pages (for example, the presentation document or the like being used during the online meeting or the like) on the first display screen and displaying the captured image and the voice recognition result that are associated by the association storage unit 1D on the second display screen.

According to the example shown in FIG. 1, the display unit 1A includes the first display screen and the second display screen; however, in other examples, the video of the online meeting and the captured image may be displayed on the same display screen.

FIG. 2 is a view describing an example in which the captured image and the voice recognition result that are associated and stored by the association storage unit 1D are displayed on the second display screen of the display unit TA.

According to the example shown in FIG. 2, the viewing assistance system 1 according to the first embodiment is used in the online meeting. The presenter of the online meeting is performing presentations with regard to an "online medical consultation system", an "operator system", a "shopping system" or the like, for example, by using the presentation document having multiple pages.

At the timing when the presenter of the online meeting beings the presentation of the "shopping system", the user of the viewing assistance system 1 makes the captured image and the voice recognition result of the "online medical consultation system" and the captured image and the voice recognition result of the "operator system" that are associated and stored by the association storage unit 1D (that is, the presentation thereof has already finished) to be displayed on the second display screen of the display unit LA.

According to the examples shown in FIG. 1 and FIG. 2, it is possible to simply and appropriately record (store) the content displayed on the first display screen of the display unit 1A. More specifically, the pages (the pages in the presentation document of the "online medical consultation system" and the "operator system") being previously displayed than the currently displayed pages (the pages in the presentation document of the "shopping system") can be viewed on the second display screen, and the presentation document of the online meeting can be displayed on the first display screen of the display unit 1A. It is possible to associate and display the captured image and the voice recognition result of the "online medical consultation system" on the second display screen of the display unit 1A, and associate and display the captured image and the voice recognition result of the "operator system" on the second display screen of the display unit 1A.

According to the example shown in FIG. 1, the page turning detection unit 1E detects the page turning of the content that is displayed on the first display screen of the display unit 1A. The page turning detection unit 1E detects the situation of switching the presentation document used during the online meeting or the like to the next page as the "page turning", for example.

The association storage unit 1D associates and stores the captured image generated by the captured image generation unit 1B with the voice recognition result. In other words, the association storage unit 1D associates and stores the captured image generated by the captured image generation unit 1B with the voice recognition result without the necessity of the instructions by the user of the viewing assistance system 1.

Figure 3:
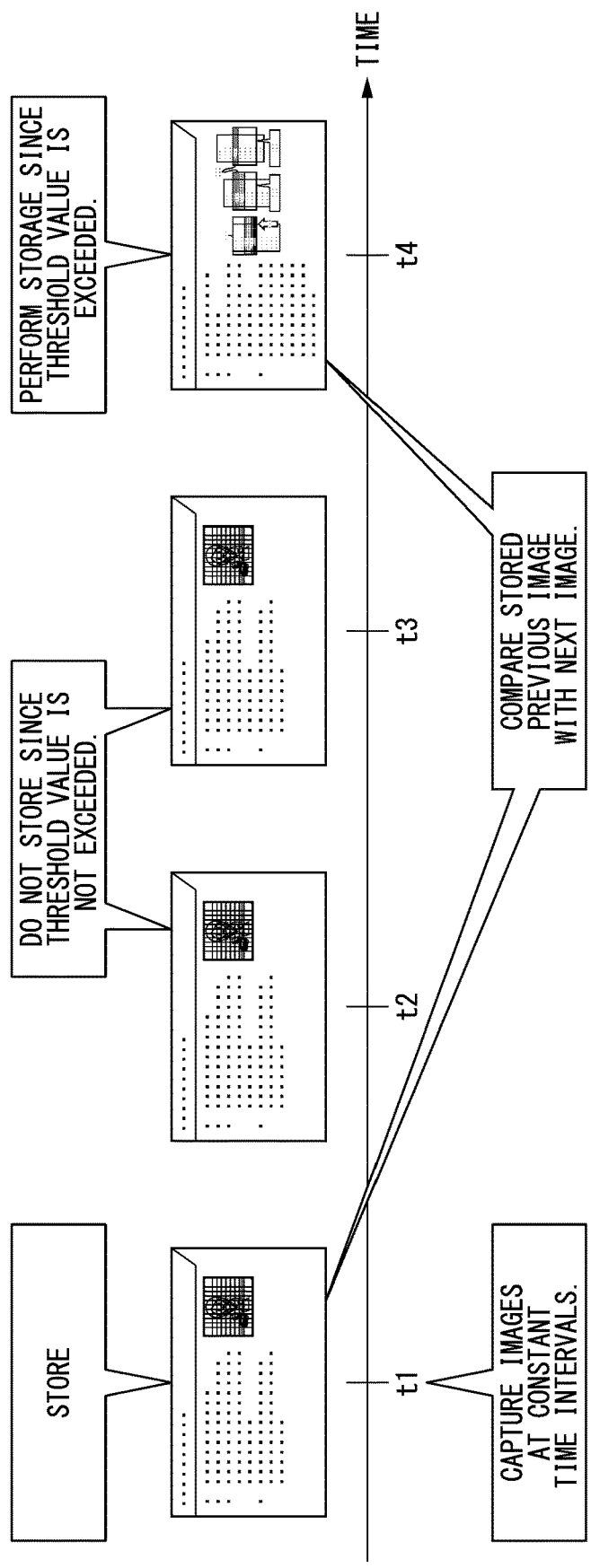
FIG. 3 is a view describing an example of a page turning determination algorithm of a page turning detection unit.

FIG. 3 is a view describing an example of a page turning determination algorithm of the page turning detection unit 1E.

According to the example shown in FIG. 3, the captured image generation unit 1B generates the multiple captured images at the predetermined captured image generation interval.

More specifically, at the time t1, the captured image generation unit 1B generates the captured image. The page turning determination unit 1E performs the comparison between the captured image at the time t1 and the stored image before the time t1 to determine whether there is a change or not. According to the example shown in FIG. 3, the image stored before the time t1 does not exist such that the captured image generated at the time t1 is stored.

Subsequently, at the time t2 (for example, three seconds after the time t1), the captured image generation unit 1B generates the captured image. The page turning detection unit 1E performs the comparison between the captured image generated at the time t2 and the captured image generated at the time t1 and then stored to determine whether there is a change or not. According to the example shown in FIG. 3, the captured image generated at the time t2 is same with the captured image generated at the time t1 such that it is determined that the page turning is not performed. As a result, the captured image generated at the time t2 is discarded without being stored. The voice recognition result at the time t2 is associated with the captured image generated at the time t1.

Subsequently, at the time t3 (for example, three seconds after the time t2), the captured image generation unit 1B generates the captured image. The page turning detection unit 1E performs the comparison between the captured image generated at the time t3 and the captured image generated at the time t1 and then stored to determine whether there is a change or not. According to the example shown in FIG. 3, the captured image generated at the time t3 is same with the captured image generated at the time t1 such that it is determined that the page turning is not performed. As a result, the captured image generated at the time t3 is discarded without being stored. The voice recognition result at the time t3 is associated with the captured image generated at the time t1.

Subsequently, at the time t4 (for example, three seconds after the time t3), the captured image generation unit 1B generates the captured image. The page turning detection unit 1E performs the comparison between the captured image generated at the time t4 and the captured image generated at the time t1 and then stored to determine whether there is a change or not. According to the example shown in FIG. 3, the captured image generated at the time t34 is different from the captured image generated at the time t1 such that it is determined that the page turning is performed. As a result, the captured image generated at the time t4 is stored. The voice recognition result at the time t4 is associated with the captured image generated at the time t4.

In this manner, the captured image is stored only at the time when the page turning is performed.

According to the example shown in FIG. 3, at the time t2, for the page turning detection unit 1E, in order to determine whether there is a page turning being performed, for example, the following processing is performed with respect to the captured image generated by the captured image generation unit 1B at the time t1 and the captured image generated by the captured image generation unit 1B at the time t2.

At first, the page turning detection unit 1E performs the grey conversion with respect to these captured images. The grey conversion is for reducing the calculation cost.

Subsequently, the page turning detection unit 1E performs the resolution conversion (reducing the resolution) with respect to these captured images for reducing the calculation cost, and performs the normalization by the size of the captured image so as to compare with a threshold value for the determination.

Subsequently, the page turning detection unit 1E performs the processing using the Gaussian filter. By blurring the image by the page turning detection unit 1E, the resistance to a slight misalignment is improved.

Subsequently, the page turning detection unit 1E calculates the sum of the differences to calculate the total value of the differences.

Subsequently, the page turning detection unit 1E compares the sum of the differences with a first threshold and in a case in which the sum of the differences exceeds the first threshold, it is determined that the page turning is performed.

According to the example shown in FIG. 1, the page turning detection unit 1E includes the video determination unit 1E1. The video determination unit 1E1 determines whether or not a video is displayed on the first display screen of the display unit 1A.

Figure 4:
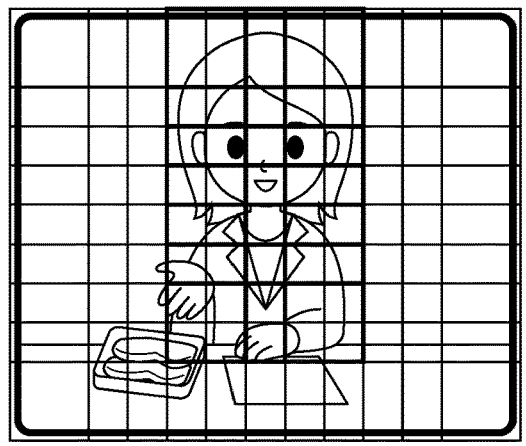
FIG. 4 is a view showing an example of a video determination algorithm of a video determination unit.

FIG. 4 is a view showing an example of the video determination algorithm of the video determination unit 1E1.

According to the example shown in FIG. 4, the video determination unit 1E1 divides the first display screen into multiple windows having certain sizes so as to determine whether the video is displayed on the first display screen of the display unit 1A.

According to the example shown in FIG. 3, as described above, for example, the captured images generated at the three-second intervals are used to determine whether or not the page turning is performed. On the other hand, according to the example shown in FIG. 4, for example, frames of the video that are acquired at the 1/30-second intervals are used to determine whether or not the video is displayed on the first display screen of the display unit 1A.

More specifically, according to the example shown in FIG. 4, the video determination unit 1E1 compares the image displayed in the certain window of the first display screen of the display unit 1A at the certain time with the image displayed in the certain window of the first display screen of the display unit 1A being 1/30 seconds later than the certain time to calculate the change amount. The calculation of the change amount in the example shown in FIG. 4 is performed by using the same algorithm with the algorithm used in the example shown in FIG. 3.

In a case in which a ratio of numbers of the changed windows with respect to the total numbers of the windows is equal to or larger than a second threshold, the video determination unit 1E1 determines that the video is displayed on the first display screen of the first display unit TA.

According to the example shown in FIG. 1, in the case in which it is determined by the video determination unit 1E1 that the video is displayed on the first display screen of the display unit 1A, the page turning detection unit 1E halts the function of detecting the page turning. As a result, it is possible to reduce the probability that the page turning detection unit 1E will erroneously detect that the page turning has been performed even though the page turning has not actually been performed.

In the case in which the function of detecting the page turning by the page turning detection unit 1E is halted, the determination whether or not the page turning is performed is manually performed by the user of the viewing assistance system 1.

According to the example shown in FIG. 1, the sorting unit 1F executes the processing of sorting the voice recognition result to be associated to either of the captured images in a case in which there are multiple captured images existing as the targets (candidates) to be associated with the voice recognition result.

For example, there is a case in which the captured image generation unit 1B generates the captured image (pre-page-turning captured image) (in the example shown in FIG. 3, the captured image at the time t1) of the content displayed on the first display screen of the display unit 1A before the timing of the page turning (in the example shown in FIG. 3, the timing between the time t3 and the time t4), and the captured image (post-page-turning captured image) (in the example shown in FIG. 3, the captured image at the time t4) of the content displayed on the first display screen of the display unit 1A after the timing of the page turning. In this case, furthermore, in a case in which the voice recognized by the voice recognition unit 1C straddles the timing of the page turning, the sorting unit 1F sorts the result (straddling voice recognition result) by recognizing the voice straddling the timing of the page turning by the voice recognition unit 1C to either of the pre-page-turning captured image (in the example shown in FIG. 3, the captured image at the time t1) and the post-page-turning captured image (in the example shown in FIG. 4, the captured image at the time t4).

In other words, the sorting unit 1F has the function of determining to which of the pre-page-turning captured image and the post-page-turning captured image the straddling voice recognition result is to be sorted.

According to a first example of the viewing assistance system 1 according to the first embodiment, the sorting unit 1F sorts the straddling voice recognition result (for example, the recognition result of the utterance voice "OK, we will proceed to describe the next page" of the presenter of the online meeting) to the captured image (voice-interrupted captured image) of the content that is displayed on the first display screen of the display unit 1A when the voice included in the content is interrupted. According to the first embodiment, the voice-interrupted captured image is either of the pre-page-turning captured image or the post-page-turning captured image. In the example shown in FIG. 3, the pre-page-turning captured image is the captured image at the time t1, and the post-page-turning captured image is the captured image at the time t4. The association storage unit 1D associates the straddling voice recognition result with the voice-interrupted captured image to store.

According to a second example of the viewing assistance system according to the first embodiment, the sorting unit 1F sorts the straddling voice recognition result (for example, the recognition result of the utterance voice "OK, we will proceed to describe the next page" of the presenter of the online meeting) to the captured image (voice-recognition-result-outputting captured image) of the content that is displayed on the first display screen of the display unit 1A when the voice recognition unit 1C outputs the straddling voice recognition result. According to the first embodiment, the voice-recognition-result-outputting captured image is either of the pre-page-turning captured image or the post-page-turning captured image. In the example shown in FIG. 3, the pre-page-turning captured image is the captured image at the time t1, and the post-page-turning captured image is the captured image at the time t4. The association storage unit 1D associates the straddling voice recognition result with the voice-recognition-result-outputting captured image to store.

According to the example shown in FIG. 1, the communication unit 11 performs processing of receiving the content to be displayed on the first display screen of the display unit 1A from the outside of the viewing assistance system 1.

The processing unit 12 performs various processing besides the processing that is performed by the above-described display unit 1A, the captured image generation unit 1B, the voice recognition unit 1C, the association storage unit 1D, the page-turning detection unit 1E, the sorting unit 1F, and the communication unit 11.

The input unit 13 receives the input operations of the user of the viewing assistance system 1 and the like.

The output unit 14 performs processing of outputting the data generated in the viewing assistance system 1 except for the display processing by the display unit 1A.

Figure 5:
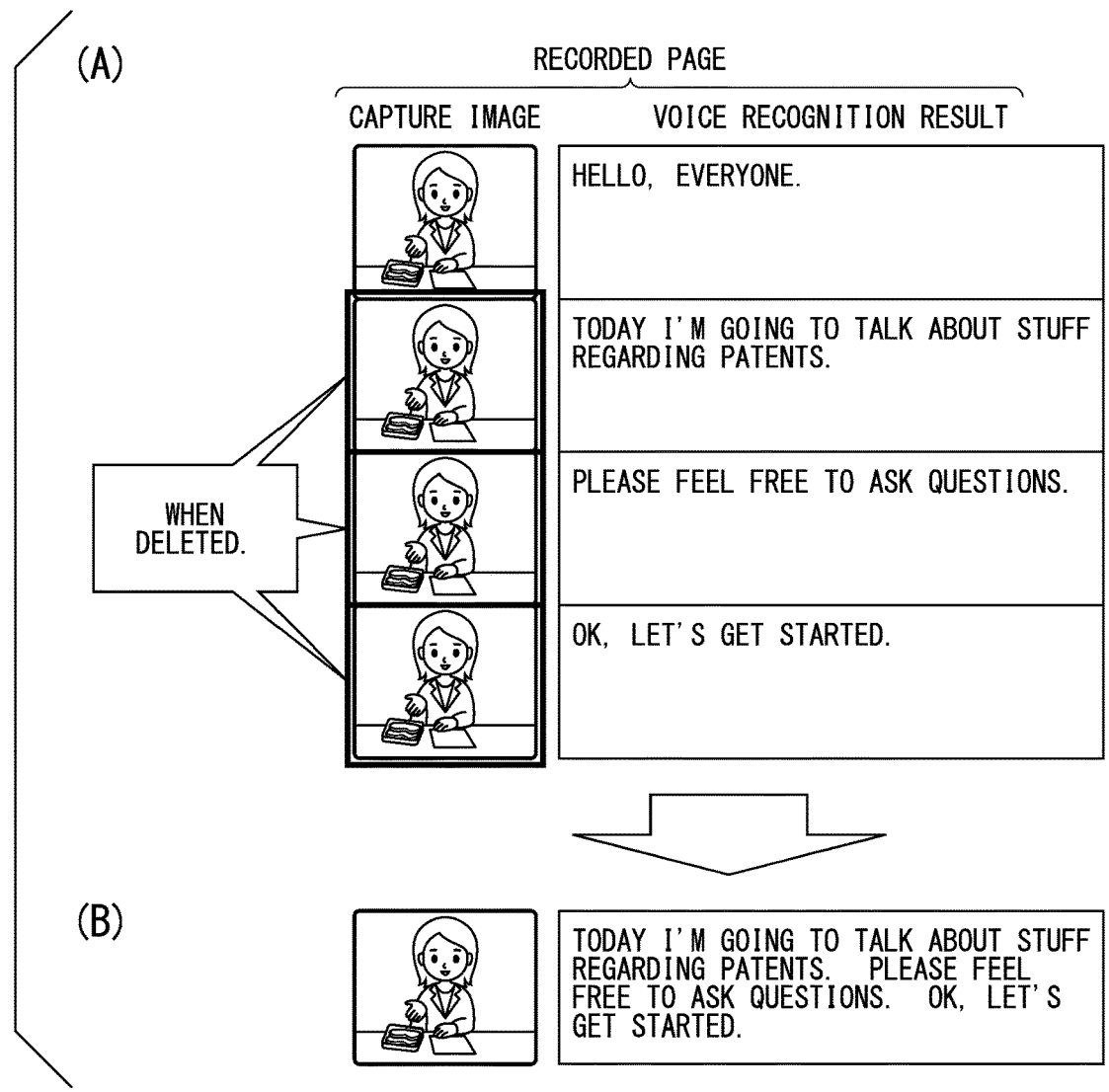
FIG. 5 is a view describing an example of processing by a recorded page deletion unit of the association storage unit.

FIG. 5 is a view describing an example of processing by the recorded page deletion unit 1D2 of the association storage unit 1D.

According to the example shown in FIG. 5, multiple recorded pages in which the voice recognition result (and note that is not shown in FIG. 5) is associated to the stored captured images. As shown in the part (A) of FIG. 5, in a case in which the recorded page deletion unit 1D2 deletes part of the multiple recorded pages, the association storage unit 1D associates the voice recognition result that is associated with the captured images configuring the deleted recorded pages to the captured images configuring the recorded pages that are not deleted to store as the recorded pages shown in the part (B) of FIG. 5. More specifically, in a case in which the recorded page deletion unit 1D2 deletes the three recorded pages at the lower side among the four recorded pages shown in the part (A) of FIG. 5, the association storage unit 1D associates the voice recognition results "TODAY I'M GOING TO TALK ABOUT STUFF REGARDING PATENTS.", "PLEASE FEEL FREE TO ASK QUESTIONS.", and "OK, LET'S GET STARTED." being associated with the captured images configuring the second recorded page to the fourth recorded page from the upper side in the part (A) of FIG. 5 with the captured image configuring the first recorded page from the upper side in the part (A) of FIG. 5 and store as the stored page shown in the part (B) of FIG. 5.

It is not shown in figures, however, in a case in which the recorded page deletion unit 1D2 deletes part of the multiple recorded pages in which the voice recognition result is associated to the stored captured image and there are multiple store pages being stored by the association storage unit 1D, the voice recognition result that is associated with the captured image configuring the deleted recorded page is associated with the captured image configuring the recorded page that is not deleted and generated by the captured image generation unit 1B at a generation time before the generation time of the captured image configuring the deleted recorded page and at the most recent generation time of the captured image configuring the deleted recorded page.

It is not shown in figures, however, in a case in which part of the multiple recorded pages are deleted, the store page that is stored by the association storage unit 1D exists, and the store page not to be deleted that is generated by the captured image generation unit 1B at the generation time before the generation time of the captured image configuring the store page to be deleted does not exist, the voice recognition result associated with the captured image configuring the store page to be deleted is associated with the captured image configuring the store page not to be deleted and generated by the captured image generation unit 1B at the generation time after the generation time of the captured image configuring the store page to be deleted.

Figure 6:
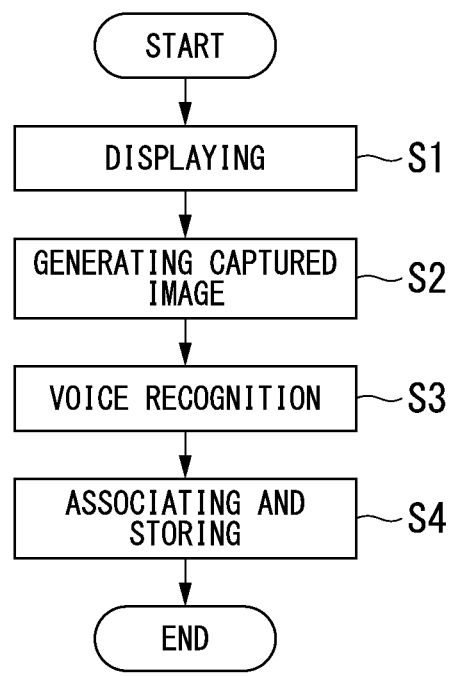
FIG. 6 is a flowchart describing an example of processing executed in the viewing assistance system according to the first embodiment.

FIG. 6 is a flowchart describing an example of processing executed in the viewing assistance system 1 according to the first embodiment. The viewing assistance system 1 has a function of storing in association with the function of the online meeting application.

According to the example shown in FIG. 6, in Step S1, the display unit 1A of the viewing assistance system 1 displays the contents having the multiple pages (for example, the presentation document or the like used during the online meeting) on the first display screen.

Subsequently, in Step S2, the captured image generation unit 1B of the viewing assistance system 1 generates the captured image of the contents displayed on the first display screen of the display unit 1A in Step S1.

In Step S3, the voice recognition unit 1C of the viewing assistance system 1 recognizes the voice included in the contents displayed on the first display screen of the display unit 1A in Step S1.

Subsequently, in Step S4, the association storage unit 1D of the viewing assistance system 1 acquires the captured image generated in Step S2. The association storage unit 1D of the viewing assistance 1 associates the voice recognition result as the result of recognizing the voice included in the contents during Step S3 with the acquired captured image and stores.

Figure 7:
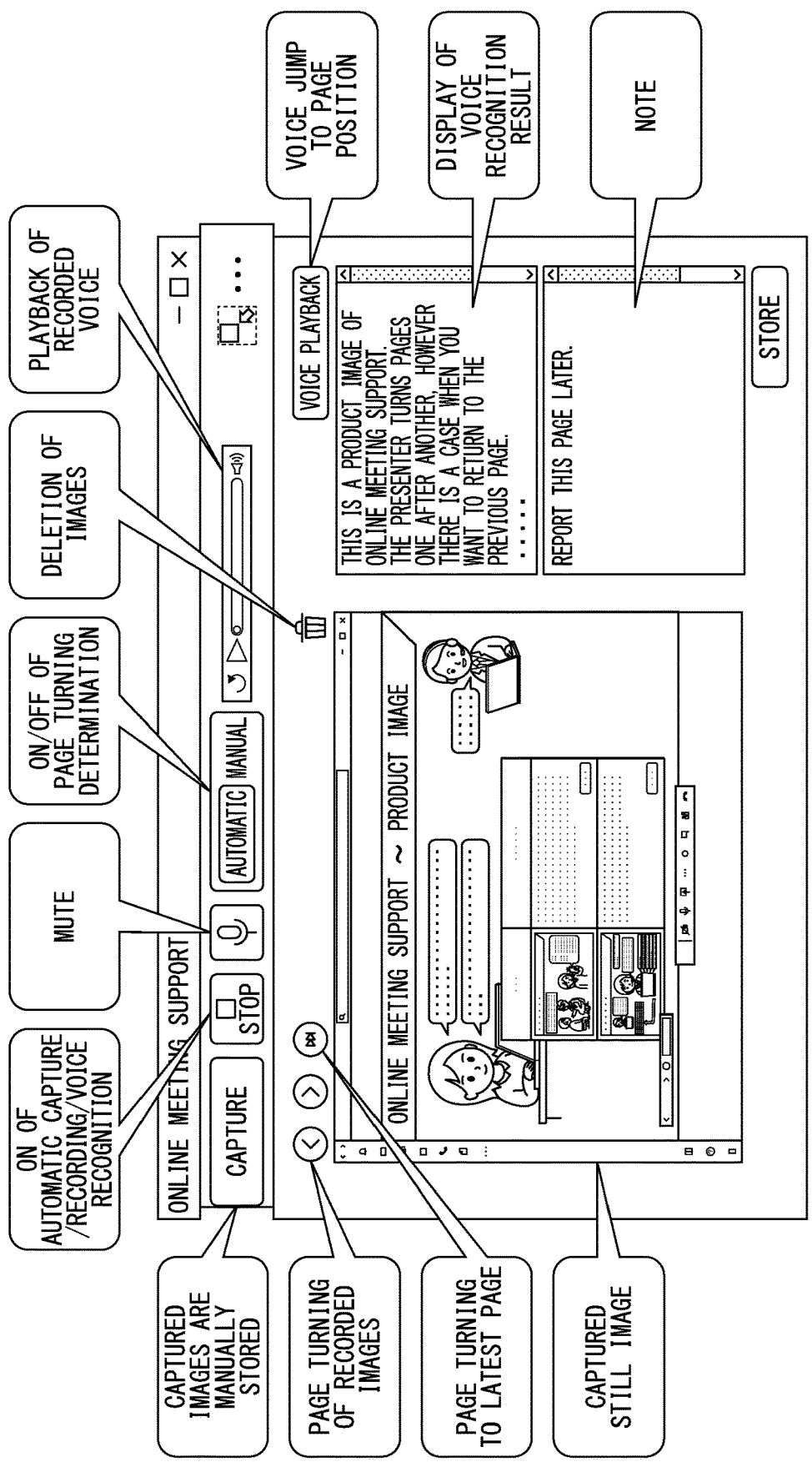
FIG. 7 is a view showing an example of the second display screen of the display unit.

FIG. 7 is a view showing an example of the second display screen (specifically, the main screen) of the display unit 1A.

According to the example shown in FIG. 7, the viewing assistance system 1 according to the first embodiment is used for viewing the presentation documents of the online meeting.

The second display screen of the display unit 1A of the viewing assistance system 1 as shown in FIG. 7 is configured by a touch panel or the like, for example, and also functions as the input unit 13 of the viewing assistance system 1 to receive the input operations of the user of the viewing assistance system 1.

The "CAPTURE" button shown in FIG. 7 receives the input operations of the user of the viewing assistance system 1 for storing (generating) the captured image of the presentation document (content). That is, the "CAPTURE" button is a button for manually storing (generating) the captured image in response to the input operation of the user of the viewing assistance system 1 rather than automatically generating the captured image by the captured image generation unit 1B of the viewing assistance system 1.

The "PAGE TURNING OF RECORDED IMAGES" button shown in FIG. 7 is a button for performing the page turning of the captured image being stored by the association storage unit 1D of the viewing assistance system 1 and displayed on the second display screen of the display unit 1A of the viewing assistance system 1.

The "PAGE TURNING TO LATEST PAGE" button shown in FIG. 7 is a button for performing the page turning of the captured image being stored by the association storage unit 1D of the viewing assistance system 1 and displayed on the second display screen of the display unit 1A of the viewing assistance system 1 to the latest page (that is, the image at the newest storage time of the captured images).

The "CAPTURED STILL IMAGE" shown in FIG. 7 shows the captured image that is stored by the association storage unit 1D of the viewing assistance system 1 and displayed on the second display screen of the display unit 1A of the viewing assistance system 1.

The captured image generation unit 1B of the viewing assistance system 1 automatically generates the captured images of the contents displayed on the first display screen of the display unit 1A of the viewing assistance system 1, and for example, the processing unit 12 of the viewing assistance system 1 automatically records the voice included in the contents. The button shown as "ON OF AUTOMATIC CAPTURE/RECORDING/VOICE RECOGNITION" in FIG. 7 is a button for the voice recognition unit 1C of the viewing assistance system 1 to switch between an ON-mode of automatically recognizing the voice included in the content and an OFF-mode in which such operations are not automatically performed.

The button "MUTE" shown in FIG. 7 is a button for switching the mute function (more specifically, to switch whether or not the utterance of the user of the viewing support system 1 is recorded).

The button "ON/OFF OF PAGE TURNING DETERMINATION" shown in FIG. 7 is a button for switching between an ON-mode in which the page turning detection unit 1E of the viewing assistance system 1 automatically detects the page turning of the contents displayed on the first display screen of the display unit 1A of the viewing assistance system 1 and an OFF-mode in which the function of the page turning detection unit 1E of the viewing assistance system 1 is halted and the determination whether or not the page turning is performed is manually performed by the user of the viewing assistance system 1.

The icon "DELETION OF IMAGES" shown in FIG. 7 receives the input operations to the viewing assistance system 1 in a case in which the user of the viewing assistance system 1 deletes the captured images stored by the association storage unit 1D of the viewing assistance system 1.

The part "PLAYBACK OF RECORDED VOICE" shown in FIG. 7 receives the input operations to the viewing assistance system 1 in a case in which the user of the viewing assistance system 1 plays back the voice that is recorded, for example, by the processing unit 12 of the viewing assistance system 1.

The button "VOICE JUMP TO PAGE POSITION" shown in FIG. 7 is a button for performing the cue playback of the voice (the voice recorded, for example, by the processing unit 12 of the viewing assistance system 1) included in the contents displayed on the first display screen of the display unit 1A of the viewing assistance system 1 when the captured image displayed on the second display screen of the display unit 1A of the viewing assistance system 1 is generated by the captured image generation unit 1B of the viewing assistance system 1.

The part "DISPLAY OF VOICE RECOGNITION RESULT" shown in FIG. 7 shows the result of the voice recognition performed by the voice recognition unit 1C of the viewing assistance system 1 when the captured image displayed on the second display screen of the display unit 1A of the viewing assistance system 1 is stored by the association storage unit 1D of the viewing assistance system 1.

According to the example shown in FIG. 7, it is disclosed that the voice recognition unit 1C performs the voice recognition without recognizing identifying the speaker (that is, the information indicating whether the speaker is the same or different is not included in the voice recognition result), however, in other examples, the voice recognition unit 1C may identify the speaker to perform the voice recognition.

As the identification method, a conventional speaker identification technique may be used, or the system-side voice and the microphone-side voice may be separated into two.

According to an example in which both of the utterance contents of myself (the user of the viewing assistance system 1) and the opponent (for example, the opponent (presenter) of the online meeting) are displayed on the second display screen of the display unit 1A of the viewing assistance system 1 as the voice recognition result, for example, the following contents are displayed on the second display screen of the display unit 1A of the viewing assistance system 1.

[Myself] How much does this system cost per month?
[Opponent] It costs starting from 10,000 yen per month.
[Myself] Could you please send me detailed materials for the table on this page?
[Opponent] I understand. We will send it to you immediately.

According to the example described above (the example in which the viewing assistance system 1 is used during the online meeting), the correspondence between [myself] and the [opponent] during the online meeting is automatically recorded by the viewing assistance system 1 and displayed on the second display screen of the display unit 1A of the viewing assistance system 1 as the voice recognition result.

In other words, the viewing assistance system 1 according to the first embodiment can be used not only for one-sided webinar viewing but also conveniently used for the online meeting.

The part "NOTE" shown in FIG. 7 shows the writing memo input by the user of the viewing assistance system 1 when the captured image displayed on the second display screen of the display unit 1A of the viewing assistance system 1 is stored by the association storage unit 1D of the viewing assistance system 1.

That is, according to the example shown in FIG. 7, it is not only that the voice recognition result by the voice recognition unit 1C of the viewing assistance system 1 is associated with the captured image that is stored in the association storage unit 1D of the viewing assistance system 1, but also the "NOTE" as the writing memo input by the user of the viewing assistance system 1 is associated with the captured image that is stored by the association storage unit 1D of the viewing assistance system 1.

As described above, according to the viewing assistance system 1 according to the first embodiment, for example, it is possible to perform the image capture (generation of the captured image of the content displayed on the first display screen of the display unit 1A) from the materials displayed on the first display screen of the display unit 1A of the viewing assistance system 1 during the online meeting at the appropriate timing and associate the captured image with the voice recognition result to store. At this time, it is possible to suitably perform the capture in accordance with the change on the first display screen of the display unit 1A of the viewing assistance system 1 and appropriately perform the association between the voice recognition result and the captured image from the voice recognition result and the captured contents. Furthermore, it is possible to appropriately perform the processing to not to delete the recognition result at the time of deleting the images.

The viewing assistance system 1 according to the first embodiment is usable as the online meeting application. The display unit 1A of the viewing assistance system 1 according to the first embodiment is applicable to the contents having multiple pages (that is, the contents being necessary to turn pages) such as the video contents, the animation contents and the like.

In the case in which the viewing assistance system 1 according to the first embodiment is applied in the online meeting, the attendance of the online meeting as the user of the viewing assistance system 1 can appropriately record the online meeting. The user of the viewing assistance system 1 can view the pages different from the page where the presentation is performed during the online meeting such that it is possible to deepen the understanding of the online meeting.

According the examples described above, the viewing assistance system 1 according to the first embodiment is a terminal device having the function of associating with the function of the online meeting application to store, however, in other examples, the viewing assistance system 1 according to the first embodiment may individually include a first terminal device having the function of the online meeting application and a second terminal device having the association and storage function.

Second Embodiment

Hereinafter, a second embodiment of the viewing assistance system, the viewing assistance system and a non-volatile recording medium storing a program of the present disclosure will be described.

The viewing assistance system 1 according to the second embodiment is similarly configured with the viewing assistance system 1 according to the above-described first embodiment except for the points described below. Accordingly, it is possible for the viewing assistance system 1 according to the second embodiment to achieve the same effects as that of the viewing assistance system 1 according to the above-described first embodiment except for the points described below.

Similar to the viewing assistance system 1 according to the first embodiment, in the viewing assistance system 1 according to the second embodiment, the sorting unit 1F executes the processing of sorting the associated voice recognition result to either of the multiple captured images in a case in which there are multiple captured images as the targets (candidates) of the association of the voice recognition result.

As described above, according to the first example of the viewing assistance system 1 according to the first embodiment, the sorting unit 1F sorts the straddling voice recognition result to the captured image (voice-interrupted captured image) of the contents displayed on the first display screen of the display unit 1A of the viewing assistance system 1 when the voice included in the contents is interrupted. According to the first embodiment, the voice-interrupted captured image is either of the pre-page-turning captured image or the post-page-turning captured image. The association storage unit 1D associates the straddling voice recognition result with the voice-interrupted captured image to store.

As described above, according to the second example of the viewing assistance system 1 according to the first embodiment, the sorting unit 1F sorts the straddling voice recognition result to the captured image (voice-recognition-result-outputting captured image) of the contents displayed on the first display screen of the display unit 1A of the viewing assistance system 1 when the voice recognition unit 1C outputs the straddling voice recognition result. According to the first embodiment, the voice-recognition-result-outputting captured image is either of the pre-page-turning captured image or the post-page-turning captured image. The association storage unit 1D associates the straddling voice recognition result with the voice-recognition-result-outputting captured image to store.

On the other hand, according to the viewing assistance system 1 according to the second embodiment, the sorting unit 1F sorts the straddling voice recognition result (for example, the recognition result of "OK, we will proceed to describe the next page." as the utterance voice of the presenter of the online meeting) to the captured image (utterance-voice-finished captured image) that is displayed on the first display screen of the display unit 1A of the viewing assistance system 1 when the utterance voice corresponding to the straddling voice recognition result is finished (that is, the timing when the utterance voice is finished, and the timing when the Japanese speech recognition result becomes a period). According to the second embodiment, the utterance-voice-finished captured image is either of the pre-page-turning captured image or the post-page-turning captured image. According to the example shown in FIG. 3, the pre-page-turning captured image is the captured image at the time t1, and the post-page-turning captured image is the captured image at the time t4. The association storage unit 1D associates the straddling voice recognition result with the utterance-voice-finished captured image to store.

Third Embodiment

Hereinafter, a third embodiment of the viewing assistance system, the viewing assistance system and a non-volatile recording medium storing a program of the present disclosure will be described.

The viewing assistance system 1 according to the third embodiment is similarly configured with the viewing assistance system 1 according to the above-described first embodiment except for the points described below. Accordingly, it is possible for the viewing assistance system 1 according to the third embodiment to achieve the same effects as that of the viewing assistance system 1 according to the above-described first embodiment except for the points described below.

According to the viewing assistance system 1 according to the third embodiment, the sorting unit 1F sorts the straddling voice recognition result (for example, the recognition result of "So far, the contents of the previous page have been described." as the utterance voice of the presenter of the online meeting) to the captured image (utterance-voice-starting captured image) that is displayed on the first display screen of the display unit 1A of the viewing assistance system 1 when the utterance voice corresponding to the straddling voice recognition result is starting (that is, the timing when the presenter of the online meeting has begun to speak). According to the second embodiment, the utterance-voice-starting captured image is either of the pre-page-turning captured image or the post-page-turning captured image. According to the example shown in FIG. 3, the pre-page-turning captured image is the captured image at the time t1, and the post-page-turning captured image is the captured image at the time t4. The association storage unit 1D associates the straddling voice recognition result with the utterance-voice-starting captured image to store.

Fourth Embodiment

Hereinafter, a fourth embodiment of the viewing assistance system, the viewing assistance system and a non-volatile recording medium storing a program of the present disclosure will be described.

The viewing assistance system 1 according to the fourth embodiment is similarly configured with the viewing assistance system 1 according to the above-described first embodiment except for the points described below. Accordingly, it is possible for the viewing assistance system 1 according to the fourth embodiment to achieve the same effects as that of the viewing assistance system 1 according to the above-described first embodiment except for the points described below.

Figure 8:
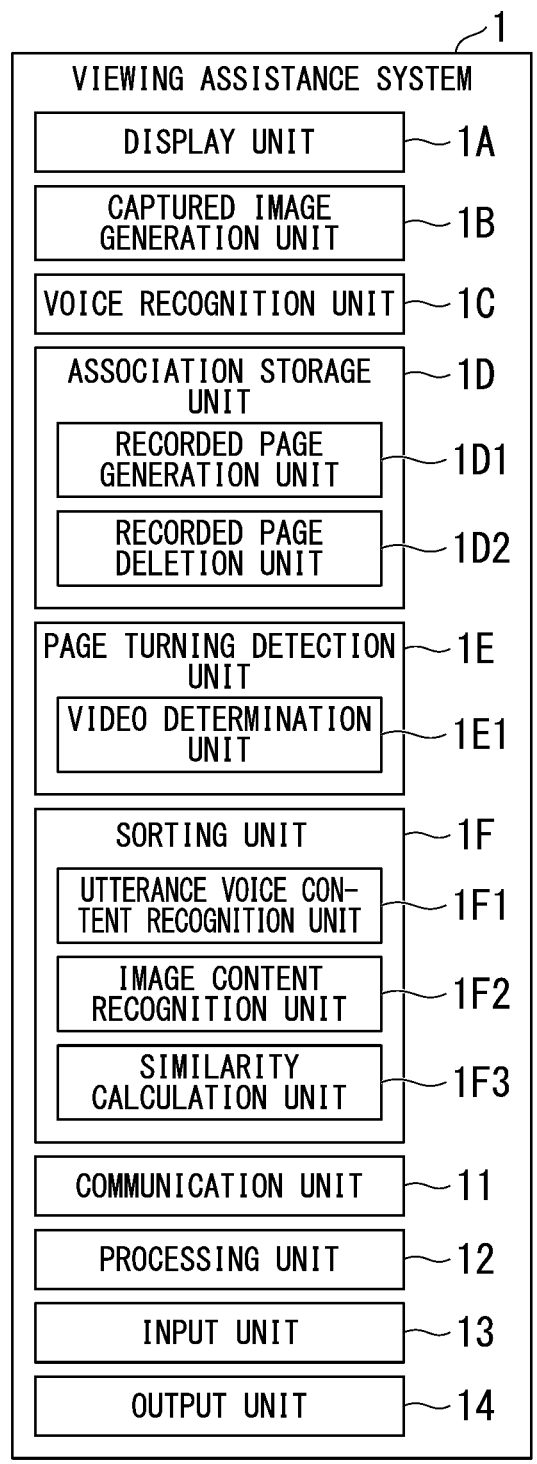
FIG. 8 is a view showing an example of a configuration of a viewing assistance system according to a fourth embodiment.

FIG. 8 is a view showing an example of a configuration of the viewing assistance system 1 according to the fourth embodiment.

According to the example shown in FIG. 8, the sorting unit 1F includes an utterance voice content recognition unit 1F1, an image content recognition unit 1F2, and a similarity calculation unit 1F3.

The utterance voice content recognition unit 1F1 recognizes the contents of the utterance voice corresponding to the straddling voice recognition result (for example, "So far, the contents regrading xxx have been described. Hereinafter, the description regarding xxx will be performed." as the recognition result of the utterance voice of the presenter of the online meeting).

The image content recognition unit 1F2 recognizes the content of the pre-page-turning captured image (in the example shown in FIG. 3, the captured image at the time t1) and the content of the post-page-turning captured image (in the example shown in FIG. 3, the captured image at the time t4).

The similarity calculation unit 1F3 calculates a first similarity as a similarity between the content of the utterance voice that is recognized by the utterance voice content recognition unit 1F1 and the content of the pre-page-turning captured image that is recognized by the image content recognition unit 1F2. The similarity calculation unit 1F3 calculates a second similarity as a similarity between the content of the utterance voice that is recognized by the utterance voice content recognition unit 1F1 and the content of the post-page-turning captured image that is recognized by the image content recognition unit 1F2.

In a case in which the first similarity is higher than the second similarity, the sorting unit 1F sorts the straddling voice recognition result to the pre-page-turning captured image. The association storage unit 1D associates the straddling voice recognition result with the pre-page-turning captured image to store.

On the other hand, in a case in which the first similarity is lower than the second similarity, the sorting unit 1F sorts the straddling voice recognition result to the post-page-turning captured image. The association storage unit 1D associates the straddling voice recognition result with the post-page-turning captured image to store.

For example, in the example in which the straddling voice recognition result is "So far, the contents regrading xxx have been described. Hereinafter, the description regarding xxx will be performed." as the recognition result of the utterance voice of the presenter of the online meeting, no matter at what timing when the page turning detection unit 1E detects the page turning during the utterance voice of "So far, the contents regrading xxx have been described. Hereinafter, the description regarding xxx will be performed.", in the case in which the first similarity is higher than the second similarity, the straddling voice recognition result is sorted to the pre-page-turning captured image, and in the case in which the first similarity is lower than the second similarity, the straddling voice recognition result is sorted to the post-page-turning captured image.

Fifth Embodiment

Hereinafter, a fifth embodiment of the viewing assistance system, the viewing assistance system and a non-volatile recording medium storing a program of the present disclosure will be described.

The viewing assistance system 1 according to the fifth embodiment is similarly configured with the viewing assistance system 1 according to the above-described first embodiment except for the points described below. Accordingly, it is possible for the viewing assistance system 1 according to the fifth embodiment to achieve the same effects as that of the viewing assistance system 1 according to the above-described first embodiment except for the points described below.

Figure 9:
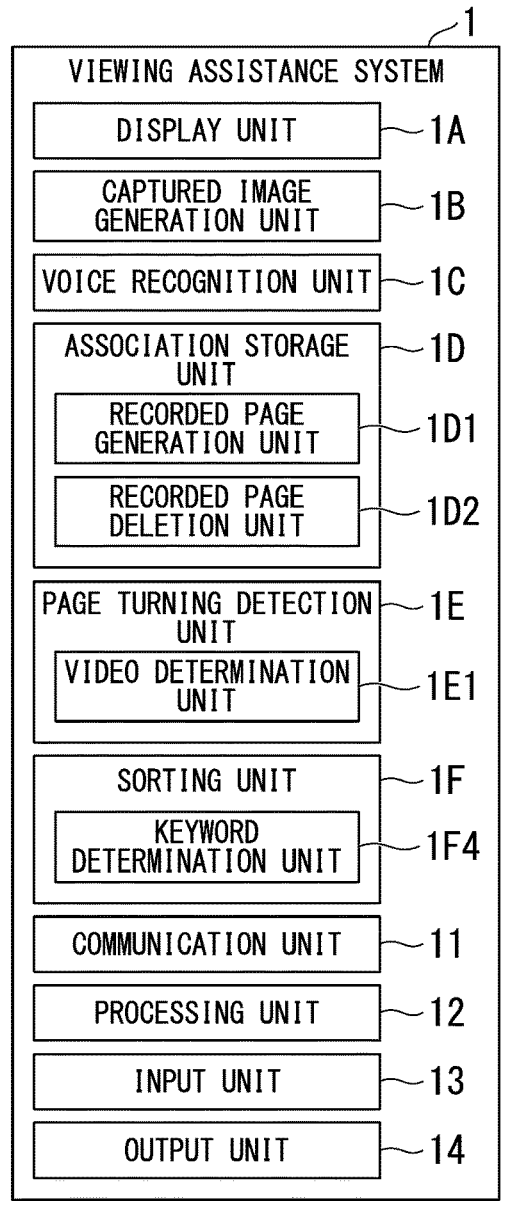
FIG. 9 is a view showing an example of a configuration of a viewing assistance system according to a fifth embodiment.

FIG. 9 is a view showing an example of a configuration of the viewing assistance system 1 according to the fifth embodiment.

According to the example shown in FIG. 9, the sorting unit 1F includes a keyword determination unit 1F4. The keyword determination unit 1F4 determines whether or not a predetermined keyword (for example, "so far . . . ", " . . . was", "next . . . ", "subsequently . . . ", and the like) is included in the utterance voice corresponding to the straddling voice recognition result.

In a case in which the keyword determination unit 1F4 determines that the predetermined keyword is included in the utterance voice corresponding to the straddling voice recognition result, the sorting unit 1F sorts the straddling voice recognition result to either of the pre-page-turning captured image (in the example shown in FIG. 3, the captured image at the time t1) or the post-page-turning captured image (in the example shown in FIG. 3, the captured image at the time t4) based on the keyword included in the utterance voice corresponding to the straddling voice recognition result. The association storage unit 1D associates the straddling voice recognition result with the sorted captured image to store.

In the case in which the keyword "so far . . . " is included in the utterance voice corresponding to the straddling voice recognition result, the sorting unit 1F sorts the straddling voice recognition result to the pre-page-turning captured image (in the example shown in FIG. 3, the captured image at the time t1).

In the case in which the keyword " . . . was" is included in the utterance voice corresponding to the straddling voice recognition result, the sorting unit 1F sorts the straddling voice recognition result to the pre-page-turning captured image (in the example shown in FIG. 3, the captured image at the time t1).

In the case in which the keyword "next . . . " is included in the utterance voice corresponding to the straddling voice recognition result, the sorting unit 1F sorts the straddling voice recognition result to the post-page-turning captured image (in the example shown in FIG. 3, the captured image at the time t4).

In the case in which the keyword "subsequently . . . " is included in the utterance voice corresponding to the straddling voice recognition result, the sorting unit 1F sorts the straddling voice recognition result to the post-page-turning captured image (in the example shown in FIG. 3, the captured image at the time t4).

Sixth Embodiment

Hereinafter, a sixth embodiment of the viewing assistance system, the viewing assistance system and a non-volatile recording medium storing a program of the present disclosure will be described.

The viewing assistance system 1 according to the sixth embodiment is similarly configured with the viewing assistance system 1 according to the above-described first embodiment except for the points described below. Accordingly, it is possible for the viewing assistance system 1 according to the sixth embodiment to achieve the same effects as that of the viewing assistance system 1 according to the above-described first embodiment except for the points described below.

As described above, according to the viewing assistance system 1 according to the first embodiment, the video determination unit 1E1 determines whether or not the video is included in the first display screen of the display unit 1A.

On the other hand, according to the viewing assistance system 1 according to the sixth embodiment, the video determination unit 1E1 determines whether or not the video is included in each of the multiple pages of the contents displayed on the first display screen of the display unit 1A.

According to the viewing assistance system 1 according to the sixth embodiment, in the page determined by the video determination unit 1E1 that the video is not included therein, the page turning detection unit 1E does not halt the function of detecting the page turning.

On the other hand, in the page determined by the video determination unit 1E1 that the video is included therein, the page turning detection unit 1E halts the function of detecting the page turning. As a result, the determination of whether or not the page turning is performed is manually performed by the user of the viewing assistance system 1. The captured image generation unit 1B generates the captured image of the content displayed on the first display screen of the display unit 1A in response to the input operations of the user of the viewing assistance system 1.

Seventh Embodiment

Hereinafter, a seventh embodiment of the viewing assistance system, the viewing assistance system and a non-volatile recording medium storing a program of the present disclosure will be described.

The viewing assistance system 1 according to the seventh embodiment is similarly configured with the viewing assistance system 1 according to the above-described first embodiment except for the points described below. Accordingly, it is possible for the viewing assistance system 1 according to the seventh embodiment to achieve the same effects as that of the viewing assistance system 1 according to the above-described first embodiment except for the points described below.

As described above, according to the viewing assistance system 1 according to the first embodiment, in the case in which the video determination unit 1E1 determines that the video is displayed on the first display screen of the display unit 1A, the page turning detection unit 1E halts the function of detecting the page turning.

On the other hand, according to the viewing assistance system 1 according to the seventh embodiment, in the case in which the video determination unit 1E1 determines that the video is displayed on the first display screen of the display unit 1A, the page turning detection unit 1E detects the page turning by excluding the part of the first display screen of the display unit 1A in which the video is included.

Figure 10:
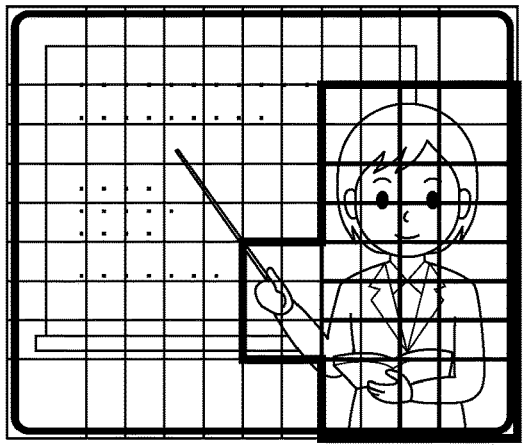
FIG. 10 is a view describing an example of a video area determination algorithm of a video determination unit.

FIG. 10 is a view showing an example for describing the video area determination algorithm of the video determination unit 1E1.

According to the example shown in FIG. 10, the video determination unit 1E1 divides the first display screen into multiple windows having certain sizes for determining the part of the video (video area) included in the first display screen of the display unit 1A.

According to the example shown in FIG. 10, similar to the example shown in FIG. 4, the frames of the video acquired at 1/30-second intervals, for example, are used to determine the video area included in the first display screen of the display unit LA.

More specifically, according to the example shown in FIG. 10, the video determination unit 1E1 compares the image displayed in the certain window in the first display screen of the display unit 1A at the predetermined time and another image displayed in the certain window in the first display screen of the display unit 1A by 1/30 seconds later than the predetermined window to calculate the change amount. The calculation of the change amount in the example shown in FIG. 10 is performed by using an algorithm being same with the algorithm used in the example shown in FIG. 3, for example.

The video determination unit 1E1 determines the area of the first display screen of the display unit 1A in which the changed window is included as the video area.

According to the viewing assistance system 1 according to the seventh embodiment, it is possible to reduce the possibility that the page turning detection unit 1E will erroneously detect that the page turning has been performed due to the change in the display state of the video area even though the page turning is not actually performed.

According to the viewing assistance system 1 according to the seventh embodiment, the video determination unit 1E1 has the function of determining whether or not a person is displayed in the first display screen of the display unit 1A. For example, a generally used technology is used as the technology for determining whether or not the person is displayed on the first display screen.

In a case in which the video determination unit 1E1 determines that the person is displayed in the first display screen of the display unit 1A, the page turning detection unit 1E detects the page turning by excluding the part of the first display screen of the display unit 1A in which the person is included therein.

Eighth Embodiment

Hereinafter, an eighth embodiment of the viewing assistance system, the viewing assistance system and a nonvolatile recording medium storing a program of the present disclosure will be described.

The viewing assistance system 1 according to the eighth embodiment is similarly configured with the viewing assistance system 1 according to the above-described first embodiment except for the points described below. Accordingly, it is possible for the viewing assistance system 1 according to the eighth embodiment to achieve the same effects as that of the viewing assistance system 1 according to the above-described first embodiment except for the points described below.

As described above, according to the viewing assistance system 1 according to the first embodiment, the page turning detection unit 1E compares the change amount (for example, the sum of the above-described differences) with the first threshold value, and determines that the page turning is performed when the change amount exceeds the first threshold value.

On the other hand, there is a case in which it is difficult for the page turning detection unit 1E to detect that the page turning has been performed when the contents having multiple pages and displayed on the first display screen of the display unit 1A are the meeting minutes (the change speed is slow and the change amount per unit time is small), the animation (only a part of the page changes and the change amount of the total page is a small value), and the like such that the change amount does not exceed the first threshold value. As a result, there is a case in which the necessary captured image is not associated and stored by the association storage unit 1D.

Accordingly, the viewing assistance system 1 according to the eighth embodiment includes the configurations described below.

Similar to the viewing assistance system 1 according to the above-described first embodiment, according to the viewing assistance system 1 according to the eighth embodiment, the captured image generation unit 1B generates multiple captured images by the predetermined captured image generation interval (for example, for every three-second interval or the like) during the period when the content is displayed on the first display screen of the display unit 1A.

That is, according to the viewing assistance system 1 according to the eighth embodiment, the captured image generation unit 1B generates the captured image of the content that is displayed on the first display screen of the display unit 1A at a first time (in the example shown in FIG. 3, the time t3) as a first captured image (in the example shown in FIG. 3, the captured image at the time t3).

Also, the captured image generation unit 1B generates the captured image of the content that is displayed on the first display screen of the display unit 1A at a second time (in the example shown in FIG. 3, the time t4) when the predetermined captured image generation interval (for example, the three-second interval or the like) elapses from the first time as a second captured image (in the example shown in FIG. 3, the captured image at the time t4).

According to the viewing assistance system 1 according to the eighth embodiment, in a case in which the change amount of the second captured image (in the example shown in FIG. 3, the captured image at the time t4) with respect to the first captured image (in the example shown in FIG. 3, the captured image at the time t3) exceeds the first threshold value, similar to the viewing assistance system 1 according to the first embodiment, the page turning detection unit 1E detects that the page turning has been performed.

According to the viewing assistance system 1 according to the eighth embodiment, being different from the viewing assistance system 1 according to the first embodiment, in the case in which the change amount of the second captured image with respect to the first captured image exceeds the first threshold value, the association storage unit 1D does not only associates the voice recognition result to the second captured image to store, but also associates the voice recognition result to the first captured image to store based on the detection result of the page turning by the page turning detection unit 1E (in the example shown in FIG. 3, the timing of the page turning is between the time t3 and the time t4).

Figure 11A:
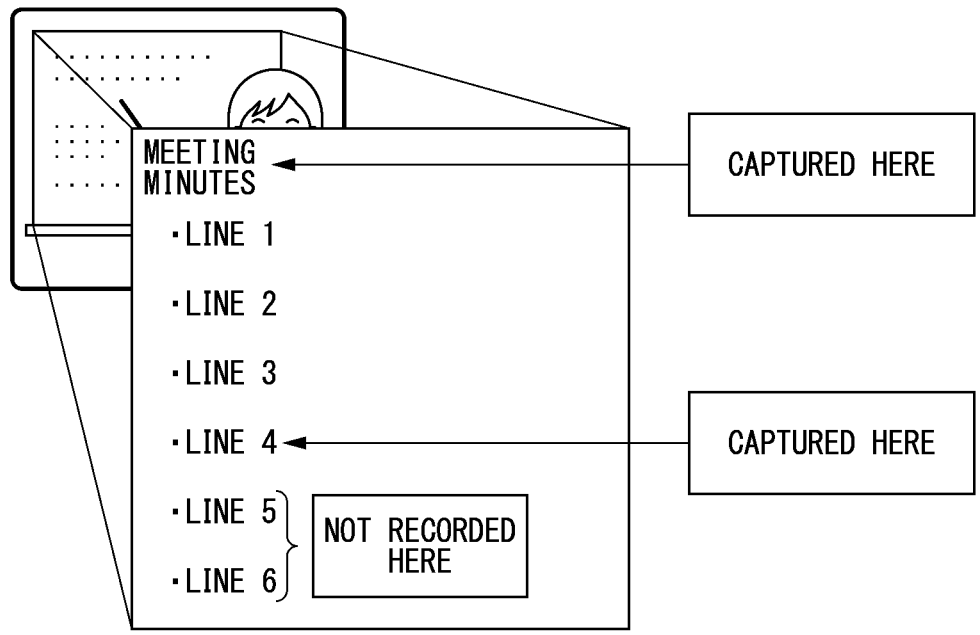
FIG. 11A is a view showing an application example of the viewing assistance system according to the eighth embodiment to describe an example in which meeting minutes are included in a page of content displayed on the display screen of the display unit.
Figure 11B:
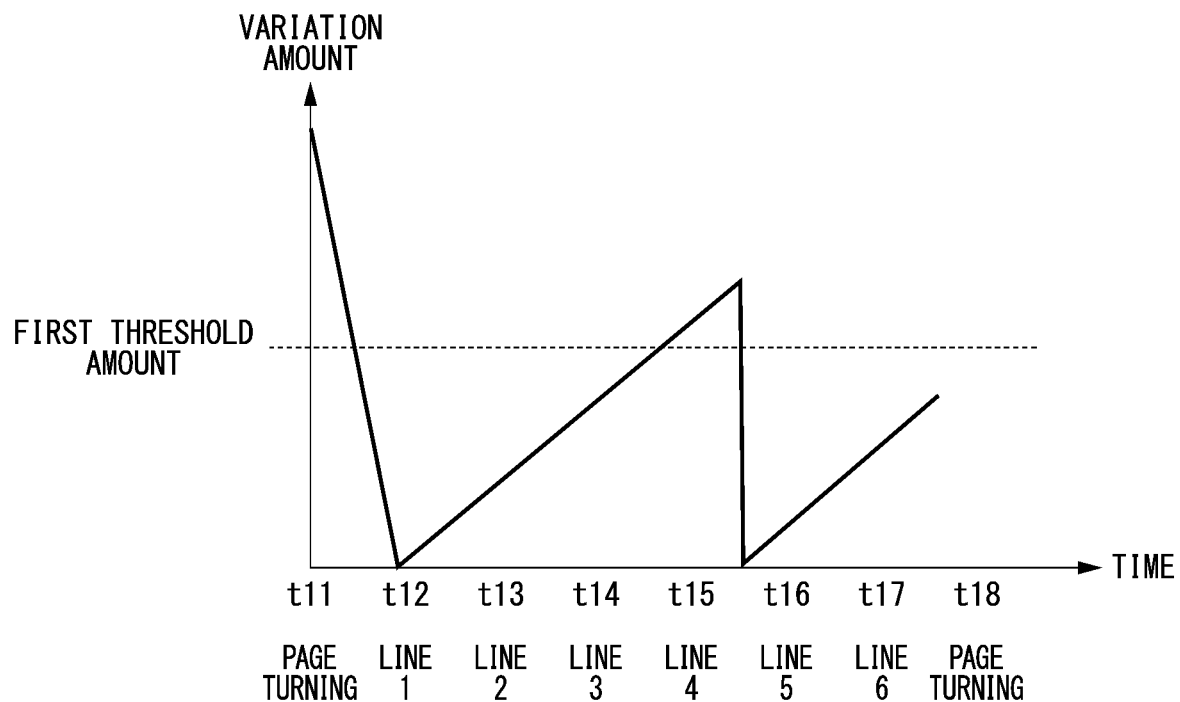
FIG. 11B is a view showing an application example of the viewing assistance system according to the eighth embodiment to describe an example in which meeting minutes are included in a page of content displayed on the display screen of the display unit.

FIG. 11A and FIG. 11B are views for describing the example as an application example of the viewing assistance system 1 according to the eighth embodiment in which the meeting minutes are included in the page of the content displayed on the first display screen of the display unit 1A. More specifically, FIG. 11A shows the first display screen of the display unit 1A, and FIG. 11B shows the relationship between the change amount (the vertical axis of FIG. 11B) of the first display screen of the display unit 1A and the time (the horizontal axis of FIG. 11B).

According to the example shown in FIG. 11B, at the time t11, the page of the content displayed on the first display screen of the display unit 1A is switched from a page not shown in figures to the page shown in FIG. 11A. More specifically, at the time t11, from "LINE 1" to "LINE 6" as shown in FIG. 11A are not yet shown in the first display screen of the display unit 1A. Accordingly, the change amount of the first display screen of the display unit 1A becomes larger than the first threshold value and the page turning detection unit 1E detects the page turning. As a result, the association storage unit 1D associates the voice recognition result to the captured image (the captured image in which only the characters "MEETING MINUTES" shown in FIG. 11A are captured) that is generated by the captured image generation unit 1B to store.

Subsequently, at the time t12, "LINE 1" in the meeting minutes shown in FIG. 11A is displayed on the first display screen of the display unit 1A. Accordingly, the change amount of the captured image (the captured image in which the characters "MEETING MINUTES" and "LINE 1" are captured) with respect to the captured image in which only the characters "MEETING MINUTES" as shown in FIG. 11A are captured increases.

Subsequently, at the time t13, "LINE 1" and "LINE 2" in the meeting minutes shown in FIG. 11A are displayed on the first display screen of the display unit 1A. Accordingly, the change amount of the captured image (the captured image in which the characters "MEETING MINUTES", "LINE 1", and "LINE 2" are captured) with respect to the captured image in which only the characters "MEETING MINUTES" as shown in FIG. 11A are captured further increases.

Subsequently, at the time t14, "LINE 1", "LINE 2", and "LINE 3" in the meeting minutes shown in FIG. 11A are displayed on the first display screen of the display unit 1A. Accordingly, the change amount of the captured image (the captured image in which the characters "MEETING MINUTES", "LINE 1", "LINE 2", and "LINE 3" are captured) with respect to the captured image in which only the characters "MEETING MINUTES" as shown in FIG. 11A are captured further increases.

Subsequently, at the time t15, "LINE 1", "LINE 2", "LINE 3", and "LINE 4" in the meeting minutes shown in FIG. 11A are displayed on the first display screen of the display unit 1A. Accordingly, the change amount of the captured image (the captured image in which the characters "MEETING MINUTES", "LINE 1", "LINE 2", "LINE 3", and "LINE 4" are captured) with respect to the captured image in which only the characters "MEETING MINUTES" as shown in FIG. 11A are captured further increases and exceeds the first threshold value such that the page turning detection unit 1E detects the page turning. As a result, the association storage unit 1D associates the voice recognition result with the captured image (the captured image in which "LINE 1", "LINE 2", "LINE 3", and "LINE 4" in the meeting minutes as shown in FIG. 11A are captured) that is generated by the captured image generation unit 1B to store.

The page turning detection unit 1E detects the page turning such that the change amount of the first display screen of the display unit 1A becomes zero (reset).

Subsequently, at the time t16, "LINE 1", "LINE 2", "LINE 3", "LINE 4", and "LINE 5" in the meeting minutes shown in FIG. 11A are displayed on the first display screen of the display unit 1A. Accordingly, the change amount of the captured image (the captured image in which the characters of "MEETING MINUTES", "LINE 1", "LINE 2", "LINE 3", "LINE 4", and "LINE 5" are captured) with respect to the captured image in which the characters of "MEETING MINUTES" shown in FIG. 11A, "LINE 1", "LINE 2", "LINE 3", and "LINE 4" are captured increases.

Subsequently, at the time t17, "LINE 1", "LINE 2", "LINE 3", "LINE 4", "LINE 5", and "LINE 6" in the meeting minutes shown in FIG. 11A are displayed on the first display screen of the display unit 1A. Accordingly, the change amount of the captured image (the captured image in which the characters of "MEETING MINUTES", "LINE 1", "LINE 2", "LINE 3", "LINE 4", "LINE 5", and "LINE 6" are captured) with respect to the captured image in which the characters of "MEETING MINUTES" shown in FIG. 11A, "LINE 1", "LINE 2", "LINE 3", and "LINE 4" are captured further increases, however, the change amount thereof is smaller than the first threshold value.

Subsequently, at the time t18, the page of the content shown on the first display screen of the display unit 1A switches from the page shown in FIG. 11A to a page not shown in figures. Accordingly, the change amount of the first display screen of the display unit 1A becomes larger than the first threshold value, and the page turning detection unit 1E detects the page turning. As a result, the association storage unit 1D associates the voice recognition result with the captured image (not shown in FIG. 11A and FIG. 11B) that is generated by the captured image generation unit 1B.

More specifically, according to the example shown in FIG. 11A and FIG. 11B in which the viewing assistance system 1 according to the eighth embodiment is applied, the association storage unit 1D does not only associate the voice recognition result with the captured image including "LINE 1", "LINE 2", "LINE 3", and "LINE 4" in the meeting minutes shown in FIG. 11A to store based on the detection result of the page turning by the page turning detection unit 1E (in the example shown in FIG. 11B, the timing of the page turning is at the time t15), but also associates the voice recognition result with the captured image including "LINE 1", "LINE 2", and "LINE 3" in the meeting minutes shown in FIG. 11A to store.

The association storage unit 1D does not only associate the voice recognition result with the captured image (not shown in FIG. 11A) that is generated by the captured image generation unit 1B at the time t18 to store based on the detection result of the page turning by the page turning detection unit 1E (in the example shown in FIG. 11B, the timing of the page turning is at the time t18), but also associates the voice recognition result with the captured image including "LINE 1", "LINE 2", "LINE 3", "LINE 4", "LINE 5", and "LINE 6" in the meeting minutes shown in FIG. 11A to store.

Ninth Embodiment

Hereinafter, a ninth embodiment of the viewing assistance system, the viewing assistance system and a non-volatile recording medium storing a program of the present disclosure will be described.

The viewing assistance system 1 according to the ninth embodiment is similarly configured with the viewing assistance system 1 according to the above-described first embodiment except for the points described below. Accordingly, it is possible for the viewing assistance system 1 according to the ninth embodiment to achieve the same effects as that of the viewing assistance system 1 according to the above-described first embodiment except for the points described below.

Figure 12:
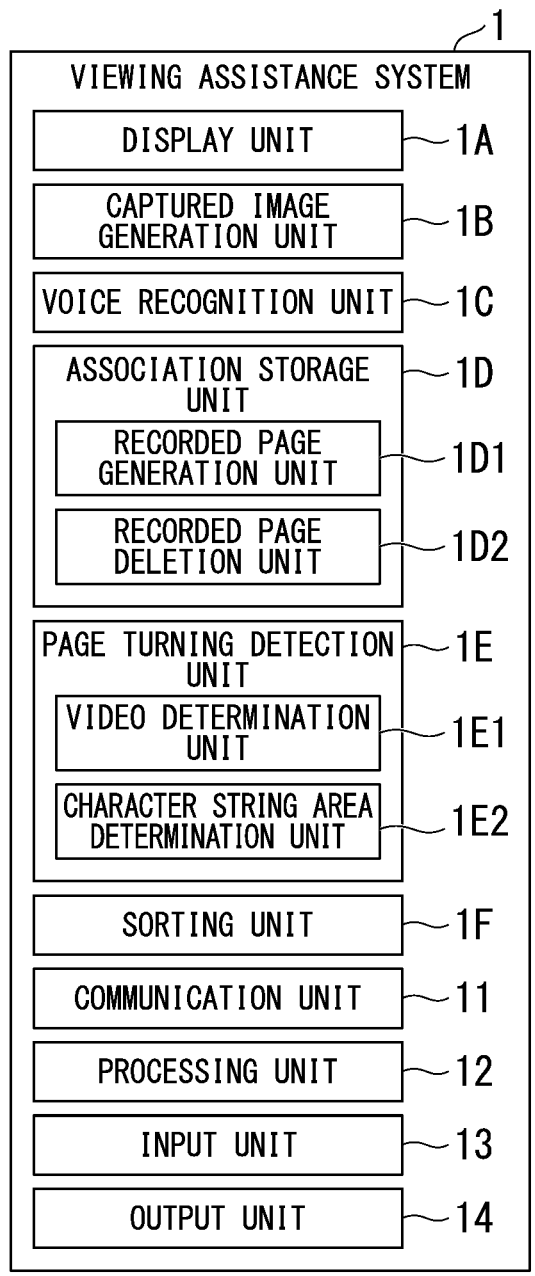
FIG. 12 is a view showing an example of a configuration of a viewing assistance system according to a ninth embodiment.

FIG. 12 is a view showing an example of the configuration of the viewing assistance system 1 according to the ninth embodiment.

According to the example shown in FIG. 12, the page turning detection unit 1E includes the video determination unit 1E1 and a character string area detection unit 1E2.

The character string area detection unit 1E2 has a function of calculating a word count included in each of the multiple captured images generated by the captured image generation unit 1B. For example, the generally used technology is used as the technology of calculating the word count included in the image.

According to the example shown in FIG. 11A and FIG. 11B, the character string area detection unit 1E2 calculates the word count included in the captured image in which only the character "MEETING MINUTES" is captured, the word count included in the captured image in which the character "MEETING MINUTES" and "LINE 1" are captured, the word count included in the captured image in which the character "MEETING MINUTES", "LINE 1", and "LINE 2" are captured, the word count included in the captured image in which the character "MEETING MINUTES", "LINE 1", "LINE 2", and "LINE 3" are captured, the word count included in the captured image in which the character "MEETING MINUTES", "LINE 1", "LINE 2", "LINE 3", and "LINE 4" are captured, the word count included in the captured image in which the character "MEETING MINUTES", "LINE 1", "LINE 2", "LINE 3", "LINE 4", and "LINE 5" are captured, and the word count included in the captured image in which the character "MEETING MIN- UTES", "LINE 1", "LINE 2", "LINE 3", "LINE 4", "LINE 5", and "LINE 6" are captured as shown in FIG. 11A.

According to the example shown in FIG. 12, the character string area detection unit 1E2 has a function of selecting the captured image in which the word count of the included characters is the largest from the multiple captured images generated by the captured image generation unit 1B.

According to the example shown in FIG. 11A, the character string area detection unit 1E2 selects the captured image in which the character "MEETING MINUTES", "LINE 1", "LINE 2", "LINE 3", "LINE 4", "LINE 5", and "LINE 6" are captured as the captured image in which the word count of the included characters is the largest.

According to the example shown in FIG. 12, the association storage unit 1D associates the voice recognition result with the captured image that is selected by the character string area determination unit 1E2.

According to the example shown in FIG. 11A and FIG. 11B, the association storage unit 1D associates the voice recognition result with the captured image in which the character "MEETING MINUTES", "LINE 1", "LINE 2", "LINE 3", "LINE 4", "LINE 5", and "LINE 6" are captured to store.

The viewing assistance system 1 according to the ninth embodiment may have a function of determining that the captured image generated by the captured image generation unit 1B is the captured image in which the creating meeting minutes are captured.

According to this example, the viewing assistance system 1 extracts the character area by performing the optical character recognition (OCR) with respect to the captured image that is generated by the captured image generation unit 1B.

In a case in which the extracted character area gradually increases over time, the viewing assistance system 1 determines that the captured image generated by the captured image generation unit 1B is the captured image in which the creating meeting minutes are captured.

The viewing assistance system 1 according to the ninth embodiment may have a function of determining that the first display screen of the display unit 1A is being scrolled based on the captured image generated by the captured image generation unit 1B.

Figure 13:
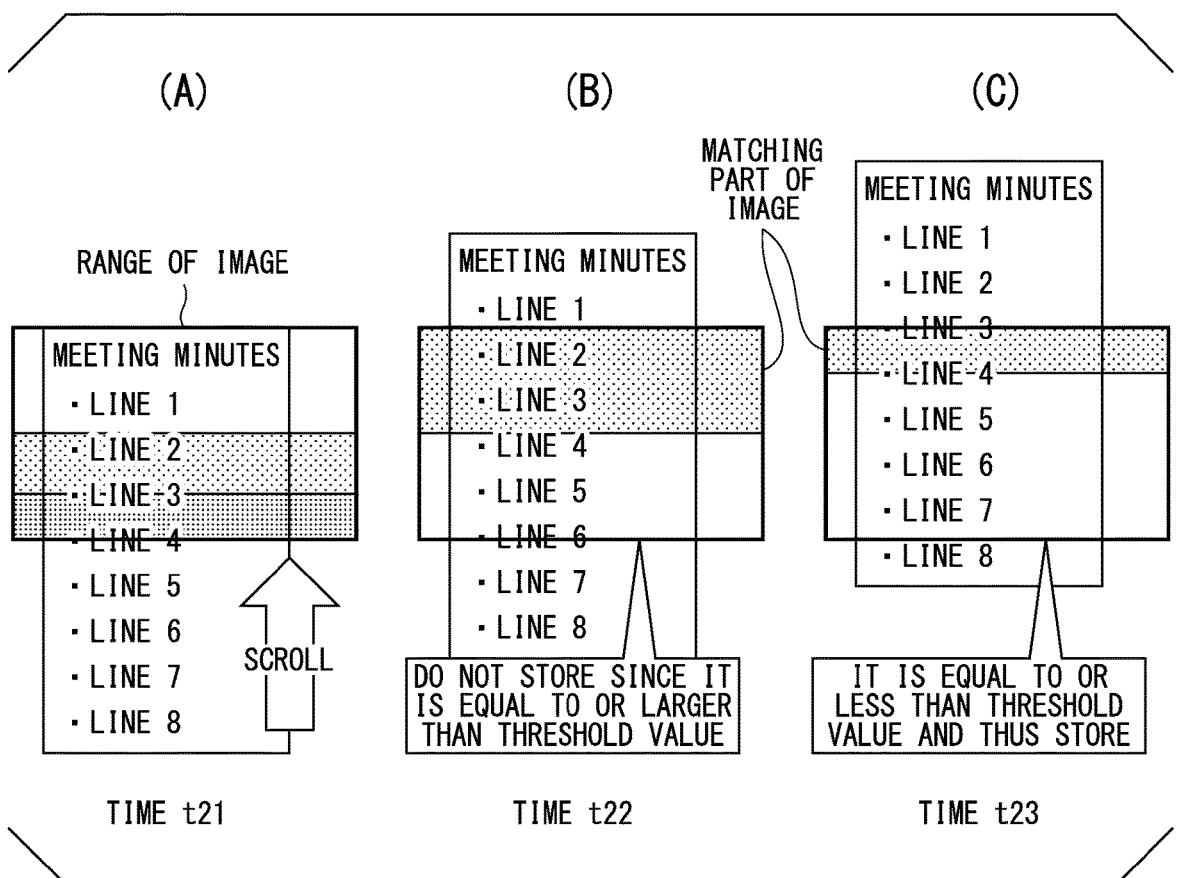
FIG. 13 is a view describing an example of a scroll determination function of the viewing assistance system according to the ninth embodiment.

FIG. 13 is a view describing an example of the scroll determination function of the viewing assistance system 1 according to the ninth embodiment.

According to the example shown in FIG. 13, the viewing assistance system 1 extracts the "part between line 3 and line 4" as a matching part among the captured image (the captured image shown in the part (A) of FIG. 13) that is generated by the captured image generation unit 1B at the time t21, the captured image (the captured image shown in the part (B) of FIG. 13) that is generated by the captured image generation unit 1B at the time t22, and the captured image (the captured image shown in the part (C) of FIG. 13) that is generated by the captured image generation unit 1B at the time t23.

The viewing assistance system 1 determines that an "up-down scroll" is performed since the "part between line 3 and line 4" as the matching part moves upwardly and downwardly.

For example, in a case in which the matching part moves to the left side and right side, the viewing assistance system 1 determines that a "left-right scroll" is performed.

According to the example shown in FIG. 13, a ratio of the total captured image by the "part between line 2 and line 4" as the matching part between the captured image (the captured image shown in the part (A) of FIG. 13) that is generated by the captured image generation unit 1B at the time t21 and the captured image (the captured image shown in the part (B) of FIG. 13) that is generated by the captured image generation unit 1B at the time t22 is equal to or larger than a third threshold value such that at the time t22, the page turning detection unit 1E does not detect that the page turning is performed.

A ratio of the total captured image by the "part between line 3 and line 4" as the matching part between the captured image (the captured image shown in the part (A) of FIG. 13) that is generated by the captured image generation unit 1B at the time t21 and the captured image (the captured image shown in the part (C) of FIG. 13) that is generated by the captured image generation unit 1B at the time t23 is smaller than the third threshold value. Accordingly, at the time t23, the page turning detection unit 1E detects that the page turning is performed and the association storage unit 1D associates the voice recognition result with the captured image generated by the captured image generation unit 1B at the time t23 to store.

According to the example shown in FIG. 13, it is possible to prevent the captured images more than necessary from being stored by the association storage unit 1D and to appropriately store (without omission) the data displayed on the first display screen of the display unit 1A as the captured images.

Tenth Embodiment

Hereinafter, a tenth embodiment of the viewing assistance system, the viewing assistance system and a non-volatile recording medium storing a program of the present disclosure will be described.

The viewing assistance system 1 according to the tenth embodiment is similarly configured with the viewing assistance system 1 according to the above-described first embodiment except for the points described below. Accordingly, it is possible for the viewing assistance system 1 according to the tenth embodiment to achieve the same effects as that of the viewing assistance system 1 according to the above-described first embodiment except for the points described below.

Figure 14:
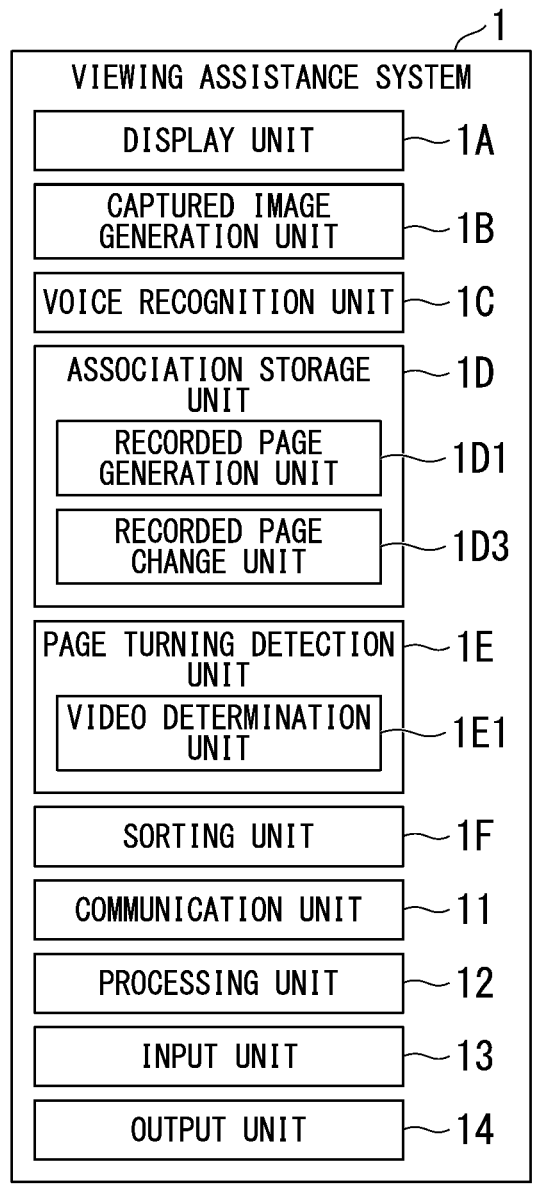
FIG. 14 is a view showing an example of a configuration of a viewing assistance system according to a tenth embodiment.

FIG. 14 is a view showing an example of a configuration of the viewing assistance system 1 according to the tenth embodiment.

As described above, according to the example shown in FIG. 1, the association storage unit 1D includes the recorded page generation unit 1D1 and the recorded page deletion unit 1D2.

On the other hand, according to the example shown in FIG. 14, the association unit 1D includes the recorded page generation unit 1D1 and a recorded page change unit 1D3.

According to the example shown in FIG. 14, the recorded page generation unit 1D1 generates the configuration by associating the voice recognition result with the captured image stored by the association storage unit 1D as the candidate of the recorded page. The recorded page generation unit 1D1 generates multiple recorded pages by associating the voice recognition result to each of the multiple captured images (in the example shown in FIG. 3, the captured image generated at the time t1 and the captured image generated at the time t4) that are generated by the captured image generation unit 1B.

According to the example shown in FIG. 14, the recorded page change unit 1D3 has a function of changing part of the multiple recorded pages generated by the recorded page generation unit 1D1.

In the case in which the recorded page change unit 1D3 changes part of the multiple recorded pages, the association storage unit 1D the captured image configuring the recorded page to be changed into a blank image. Furthermore, the association storage unit 1D associates the voice recognition result associated to the captured image configuring the recorded page to be changed with the blank image and stores as the recorded page.

In other words, according to the example shown in FIG. 14, in a case in which it is unnecessary to store the captured image generated by the captured image generation unit 1B, the captured image which is unnecessary to be stored is changed to the blank image. Furthermore, the voice recognition result associated to the captured image that is unnecessary to be stored is associated to the blank image and stored as the recorded image.

Accordingly, according to the example shown in FIG. 14, for example, even if in a case in which there are no pre-page or post-page to be joined thereto such as the first page of the presentation document, it is possible to store the recognition result of the voice at the time when the page (the first page) is displayed.

Eleventh Embodiment

Hereinafter, an eleventh embodiment of the viewing assistance system, the viewing assistance system and a non-volatile recording medium storing a program of the present disclosure will be described.

The viewing assistance system 1 according to the eleventh embodiment is similarly configured with the viewing assistance system 1 according to the above-described first embodiment except for the points described below. Accordingly, it is possible for the viewing assistance system 1 according to the eleventh embodiment to achieve the same effects as that of the viewing assistance system 1 according to the above-described first embodiment except for the points described below.

Figure 15:
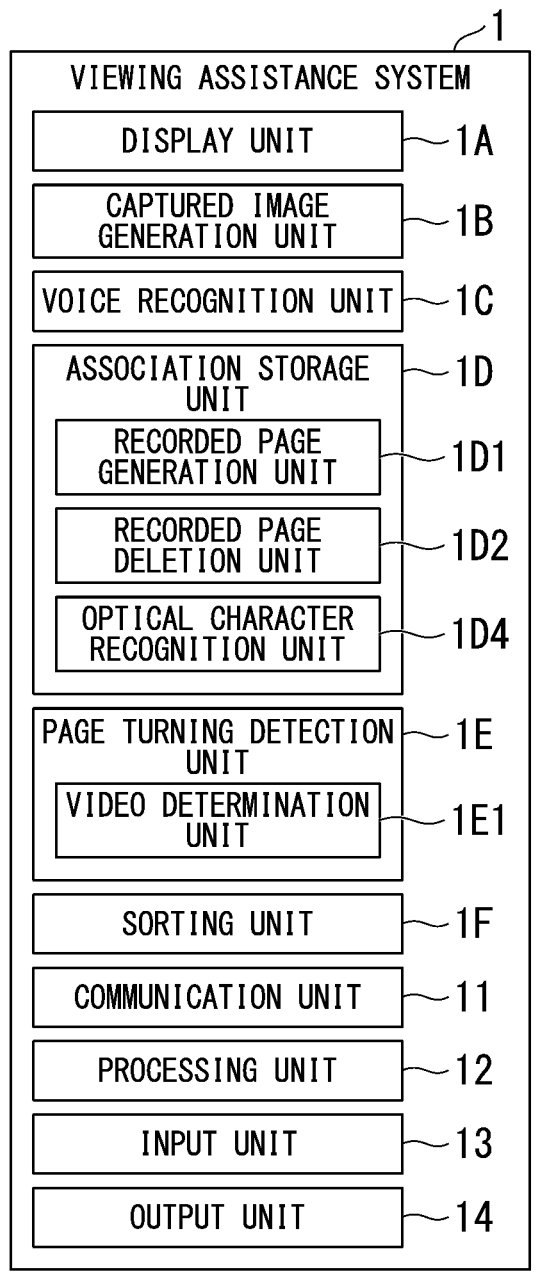
FIG. 15 is a view showing an example of a configuration of a viewing assistance system according to an eleventh embodiment.

FIG. 15 is a view showing an example of a configuration of the viewing assistance system 1 according to the eleventh embodiment.

As described above, according to the example shown in FIG. 1, the association storage unit 1D includes the recorded page generation unit 1D1 and the recorded page deletion unit 1D2.

On the other hand, according to the example shown in FIG. 15, the association storage unit 1D includes the recorded page generation unit 1D1, the recorded page deletion unit 1D2, and an optical character recognition unit 1D4.

According to the example shown in FIG. 15, the recorded page generation unit 1D1 generates the configuration by associating the voice recognition result with the captured image stored by the association storage unit 1D as the candidate of the recorded page. The recorded page generation unit 1D1 generates multiple recorded pages by associating the voice recognition result to each of the multiple captured images (in the example shown in FIG. 3, the captured image generated at the time t1 and the captured image generated at the time t4) that are generated by the captured image generation unit 1B. The recorded page deletion unit 1D2 has the function of deleting part of the multiple recorded pages generated by the recorded page generation unit 1D1.

According to the example shown in FIG. 15, in the case in which the recorded page deletion unit 1D2 deletes part of the multiple recorded pages, the optical character recognition unit 1D4 performs the optical character recognition of a pre-captured image. The pre-captured image is a captured image configuring the recorded page that is not deleted and generated by the captured image generation unit 1B at the generation time before the generation time of the captured image configuring the recorded page to be deleted. Furthermore, the optical character recognition unit 1D4 performs the optical character recognition of a post-captured image. The post-captured image is a captured image configuring the recorded page that is not deleted and generated by the captured image generation unit 1B at the generation time after the generation time of the captured image configuring the recorded page to be deleted.

The association storage unit 1D calculates a similarity (first similarity) between the optical character recognition result of the pre-captured image and the voice recognition result associated with the captured image configuring the recorded page to be deleted.

The association storage unit 1D calculates a similarity (second similarity) between the optical character recognition result of the post-captured image and the voice recognition result associated with the captured image configuring the recorded page to be deleted.

Furthermore, the association storage unit 1D associates the voice recognition result that is associated to the captured image configuring the recorded page to be deleted to either of the pre-captured image or the post-captured image based on the first similarity and the second similarity to store as the recorded page.

Twelfth Embodiment

Hereinafter, a twelfth embodiment of the viewing assistance system, the viewing assistance system and a non-volatile recording medium storing a program of the present disclosure will be described.

The viewing assistance system 1 according to the twelfth embodiment is similarly configured with the viewing assistance system 1 according to the above-described first embodiment except for the points described below. Accordingly, it is possible for the viewing assistance system 1 according to the twelfth embodiment to achieve the same effects as that of the viewing assistance system 1 according to the above-described first embodiment except for the points described below.

The viewing assistance system 1 according to the twelfth embodiment is a terminal device which does not have the function of the online meeting application, and has the functions of associating and storing.

The above-described viewing assistance system 1 according to the first embodiment includes the communication unit 11, however, the viewing assistance system 1 according to the twelfth embodiment does not include the communication unit 11.

The viewing assistance system 1 according to the twelfth embodiment has the function of recording an operation method of a terminal device (personal computer, PC) to create a manual of the terminal device.

The user of the viewing assistance system 1 according to the twelfth embodiment performs the predetermined operations, and the captured image generation unit 1B creates the captured image of the windows at that time (that is, the captured image generation unit 1B generates the captured image of the first display screen of the display unit 1A at that time).

The user of the viewing assistance system 1 according to the twelfth embodiment orally describes the operations, and the voice recognition unit 1C recognizes the voice (the utterance voice of the user of the viewing assistance system 1) to output the voice recognition result.

The association storage unit 1D associates the voice recognition result by the voice recognition unit 1C with the captured image generated by the captured image generation unit 1B to store.

Thirteenth Embodiment

Hereinafter, a thirteenth embodiment of the viewing assistance system, the viewing assistance system and a nonvolatile recording medium storing a program of the present disclosure will be described.

The viewing assistance system 1 according to the thirteenth embodiment is similarly configured with the viewing assistance system 1 according to the above-described first embodiment except for the points described below. Accordingly, it is possible for the viewing assistance system 1 according to the thirteenth embodiment to achieve the same effects as that of the viewing assistance system 1 according to the above-described first embodiment except for the points described below.

The viewing assistance system 1 according to the thirteenth embodiment is a terminal device which does not have the function of the online meeting application, and has the functions of associating and storing.

The above-described viewing assistance system 1 according to the first embodiment includes the communication unit 11, however, the viewing assistance system 1 according to the thirteenth embodiment does not include the communication unit 11.

The viewing assistance system 1 according to the thirteenth embodiment has the function of creating an operation record of the terminal device (PC) by the user of the viewing assistance system 1.

The user of the viewing assistance system 1 according to the thirteenth embodiment performs the predetermined operations, and the captured image generation unit 1B creates the captured image of the windows at that time (that is, the captured image generation unit 1B generates the captured image of the first display screen of the display unit 1A at that time).

The user of the viewing assistance system 1 according to the thirteenth embodiment orally describes the operations if necessary, and the voice recognition unit 1C recognizes the voice (the utterance voice of the user of the viewing assistance system 1) to output the voice recognition result.

The association storage unit 1D associates the voice recognition result by the voice recognition unit 1C with the captured image generated by the captured image generation unit 1B to store (in a case in which the user of the viewing assistance system 1 does not speak and the voice recognition result does not exist, only the captured image is stored).

According to at least one embodiment described above, the viewing assistance system 1 includes the display unit 1, the captured image generation unit 1B, the voice recognition unit 1C, and the association storage unit 1D. The display unit 1A has a display screen (first display screen) capable of displaying the content having multiple pages. The captured image generation unit 1B generates the captured image of the content displayed on the display screen (first display screen). The voice recognition unit 1C recognizes the voice included in the content. The association storage unit 1D associates the result that is recognized by the voice recognizing unit 1C recognizing the voice included in the content as the voice recognition result with the captured image generated by the captured image generation unit 1B to store. Accordingly, it is possible to simply and appropriately record the displayed contents.

At least part of the functions of the viewing assistance system 1 according to the above-described embodiments (including modification example) may be realized by a computer. In that case, a program for realizing this function may be recorded in a computer-readable recording medium, and the program recorded in the recording medium may be read into a computer system and executed therein. It should be noted that the "computer system" referred thereto includes an OS and hardware such as peripheral devices. In addition, the "computer-readable recording media" refers to portable media such as flexible discs, magneto-optical discs, ROMs, CD-ROMs, DVD-ROMs, USB memories, and storage devices such as hard disks built into computer systems. Furthermore, the "computer-readable recording medium" may include a medium that dynamically retains a program for a short period of time, like a communication line when transmitting a program via a network such as the Internet or a communication line such as a telephone line, and a device that holds a program for a certain period of time, such as a volatile memory inside a computer system that serves as a server or client in that case. Also, the program may be made for realizing part of the functions described above, or may be capable of realizing the functions described above in combination with a program already recorded in the computer system.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A viewing assistance system, comprising:
a display unit including a display screen on which a content having multiple pages are displayable;
a captured image generation unit that generates a captured image of the content that is displayed on the display screen;
a voice recognition unit that recognizes a voice included in the content;
a page turning detection unit that detects a page turning of the content that is displayed on the display screen; and
an association storage unit that associates a voice recognition result that is a result of recognizing the voice included in the content by the voice recognition unit with the captured image generated by the captured image generation unit to store based on a detection result of the page turning by the page turning detection unit,
wherein in a case in which the captured image generation unit generates a pre-page-turning captured image as the captured image of the content displayed on the display screen before the timing of the page turning and a post-page-turning captured image as the captured image of the content displayed on the display screen after the timing of the page turning, and the voice recognized by the voice recognition unit straddles the timing of the page turning, the viewing assistance system further comprises a sorting unit that sorts a straddling voice recognition result that is a result of recognizing the voice straddling the timing of the page turning by the voice recognition unit to either of the pre-page-turning captured image or the post-page-turning captured image, and the sorting unit has a function of determining to which of the pre-page-turning captured image or the post-page-turning captured image the straddling voice recognition result is sorted to.

2. The viewing assistance system according to claim 1, wherein the sorting unit comprises an utterance voice content recognition unit that recognizes a content of an utterance voice corresponding to the straddling voice recognition result;

an image content recognition unit that recognizes contents of the pre-page-turning captured image and the post-page-turning captured image; and a similarity calculation unit that calculates a first similarity that is a similarity between the content of the utterance voice recognized by the utterance voice content recognition unit and the content of the pre-page-turning captured image that is recognized by the image content recognition unit, and a second similarity that is a similarity between the content of the utterance voice recognized by the utterance voice content recognition unit and the content of the post-page-turning captured image that is recognized by the image content recognition unit, in a case in which the first similarity is higher than the second similarity, the sorting unit sorts the straddling voice recognition result to the pre-page-turning captured image and the association storage unit associates the straddling voice recognition result with the pre-page-turning captured image to store, and in a case in which the first similarity is lower than the second similarity, the sorting unit sorts the straddling voice recognition result to the post-page-turning captured image and the association storage unit associates the straddling voice recognition result with the post-page-turning captured image to store.

3. The viewing assistance system according to claim 1, wherein the sorting unit comprises a keyword determination unit that determines whether a predetermined keyword is included in an utterance voice corresponding to the straddling voice recognition result, in a case in which the keywords is determined to be included in the utterance voice by the keyword determination unit, the sorting unit sorts the straddling voice recognition result to either of the pre-page-turning captured image or the post-page-turning captured image, and the association storage unit associates and stores the straddling voice recognition result to the captured image to which the straddling voice recognition result is sorted.

4. The viewing assistance system according to claim 1, wherein the page turning detection unit includes a video determination unit that determines whether a video is displayed on the display screen.

5. The viewing assistance system according to claim 4, wherein in a case in which the video is determined to be included in the display screen by the video determination unit, the page turning detection unit halts the function of detecting the page turning.

6. The viewing assistance system according to claim 4, wherein in a case in which the video is determined to be included in the display screen by the video determination unit, the page turning detection unit detects the page turning by excluding a part of the display screen in which the video is included.

7. The viewing assistance system according to claim 1, wherein the captured image generation unit generates a first captured image that is the captured image of the content displayed on the display screen at a first time and a second captured image that is the captured image of the content displayed on the display screen at a second time when a predetermined captured image generation interval is elapsed from the first time, and in a case in which a change amount of the second captured image with respect to the first captured image exceeds a threshold value, the page turning detection unit detects the page turning, and the association storage unit associates the voice recognition result with the second captured image to store while associating the voice recognition result with the first captured image based on a detection result of the page turning by the page turning detection unit.

8. The viewing assistance system according to claim 1 wherein the captured image generation unit generates multiple captured images at a predetermined captured image generation interval, the page turning detection unit includes a character string area determination unit, the character string area determination unit has a function of calculating a word count included in each of the multiple captured images generated by the captured image generation unit, and a function of selecting the captured image having the most word count among the multiple captured images generated by the captured image generation unit, and the association storage unit associates the voice recognition result with the captured image that is selected by the character string area determination unit to store.

9. The viewing assistance system according to claim 1, wherein the captured image generation unit generates multiple captured images by a predetermined captured image generation interval, the association storage unit includes a recorded page generation unit and a recorded page deletion unit, the recorded page generation unit generates multiple recorded pages by associating the voice recognition result to each of the multiple captured images generated by the captured image generation unit as candidates of a storage page in which the voice recognition result is associated with the captured image stored in the association storage unit, the recorded page deletion unit has a function of deleting a part of the multiple recorded pages generated by the recorded page generation unit, and in a case in which the recorded page deletion unit deletes a part of the multiple recorded pages, the association storage unit associates the voice recognition result associated with the captured image configuring the recorded page to be deleted with the captured image configuring the recorded page that is not deleted and stores as the storage page.

10. The viewing assistance system according to claim 1,
wherein the captured image generation unit generates multiple captured images by a predetermined captured image generation interval, the association storage unit includes a recorded page generation unit and a recorded page change unit, the recorded page generation unit generates multiple recorded pages by associating the voice recognition result to each of the multiple captured images generated by the captured image generation unit as candidates of a storage page in which the voice recognition result is associated with the captured image stored in the association storage unit, the recorded page change unit has a function of changing a part of the multiple recorded pages generated by the recorded page generation unit, and in a case in which the recorded page change unit changes a part of the multiple recorded pages, the association storage unit changes the captured image configuring the recorded page to be changed into a blank image, and associates the voice recognition result associated with the captured image configuring the recorded page to be changed with the blank image and stores as the storage page.

11. The viewing assistance system according to claim 1,
wherein the captured image generation unit generates multiple captured images by a predetermined captured image generation interval, the association storage unit includes a recorded page generation unit, a recorded page deletion unit, and an optical character recognition unit, the recorded page generation unit generates multiple recorded pages by associating the voice recognition result to each of the multiple captured images generated by the captured image generation unit as candidates of a storage page in which the voice recognition result is associated with the captured image stored in the association storage unit, the recorded page deletion unit has a function of deleting a part of the multiple recorded pages generated by the recorded page generation unit, in a case in which the recorded page deletion unit deletes a prat of the multiple recorded pages, the optical character recognition unit performs an optical character recognition of a pre-captured image that is the captured image configuring the recorded page not to be deleted and generated by the captured image generation unit at a generation time before the generation time of the captured imaging configuring the recorded page to be deleted, and performs the optical character recognition of a post-captured image that is the captured image configuring the recorded page not to be deleted and generated by the captured image generation unit at the generation time after the generation time of the captured imaging configuring the recorded page to be deleted, and the association storage unit associates the voice recognition result associated with the captured image configuring the recorded page to be deleted with either of the pre-captured image and the post-captured image and stores as the storage page based on a similarity between the recognition result of the optical character recognition of the pre-captured image and the voice recognition result associated with the captured image configuring the recorded page to be deleted and a similarity between the recognition result of the optical character recognition of the post-captured image and the voice recognition result associated with the captured image configuring the recorded page to be deleted.

12. A viewing assistance method, comprising:

a captured image acquisition step of acquiring a captured image of a content having multiple pages displayed on a display screen;

a voice recognition step of recognizing a voice included in the content;

a page turning detection step that detects a page turning of the content that is displayed on the display screen; and an association storage step of associating and storing a voice recognition result that is a result of recognizing the voice included in the content during the voice recognition step with the captured image generated during the captured image acquisition step based on a detection result of the page turning by the page turning detection step, wherein in a case in which the captured image generation step generates a pre-page-turning captured image as the captured image of the content displayed on the display screen before the timing of the page turning and a post-page-turning captured image as the captured image of the content displayed on the display screen after the timing of the page turning, and the voice recognized by the voice recognition step straddles the timing of the page turning, the viewing assistance method further comprises a sorting step that sorts a straddling voice recognition result that is a result of recognizing the voice straddling the timing of the page turning by the voice recognition step to either of the pre-page-turning captured image or the post-page-turning captured image, and the sorting step has a function of determining to which of the pre-page-turning captured image or the post-page-turning captured image the straddling voice recognition result is sorted to.

13. A non-volatile recording medium storing a program to make a computer to execute:

a captured image acquisition step of acquiring a captured image of a content having multiple pages displayed on a display screen;

a voice recognition step of recognizing a voice included in the content;

a page turning detection step that detects a page turning of the content that is displayed on the display screen; and an association storage step of associating and storing a voice recognition result that is a result of recognizing the voice included in the content during the voice recognition step with the captured image generated during the captured image acquisition step based on a detection result of the page turning by the page turning detection step, wherein in a case in which the captured image generation step generates a pre-page-turning captured image as the captured image of the content displayed on the display screen before the timing of the page turning and a post-page-turning captured image as the captured image of the content displayed on the display screen after the timing of the page turning, and the voice recognized by the voice recognition step straddles the timing of the page turning, the program further makes the computer execute a sorting step that sorts a straddling voice recognition result that is a result of recognizing the voice straddling the timing of the page turning by the voice recognition step to either of the pre-page-turning captured image or the post-page-turning captured image, and the sorting step has a function of determining to which of the pre-page-turning captured image or the post-page-turning captured image the straddling voice recognition result is sorted to.

* * * * *